United States Patent
Woodrick et al.

(10) Patent No.: US 11,195,198 B2
(45) Date of Patent: Dec. 7, 2021

(54) PAYMENT CARD BENEFIT VALUE ESTIMATOR SYSTEM AND METHOD WITH TRANSACTION-BASED INDIVIDUAL CARDHOLDER RELEVANCE OF SELECTABLE BENEFITS

(71) Applicant: MASTERCARD INTERNATIONAL INCORPORATED, Purchase, NY (US)

(72) Inventors: Brian Woodrick, St. Charles, MO (US); Travis Michael Carpenter, Glencoe, MO (US); Robert Thomas Grothe, Kirkwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/681,216

(22) Filed: Nov. 12, 2019

(65) Prior Publication Data
US 2021/0142352 A1 May 13, 2021

(51) Int. Cl.
*G06Q 30/02* (2012.01)
*G06Q 20/40* (2012.01)

(52) U.S. Cl.
CPC ..... *G06Q 30/0224* (2013.01); *G06Q 20/4097* (2013.01); *G06Q 30/0204* (2013.01); *G06Q 30/0208* (2013.01); *G06Q 30/0215* (2013.01)

(58) Field of Classification Search
CPC .......... G06Q 30/0224; G06Q 30/0204; G06Q 30/0208; G06Q 30/0215
See application file for complete search history.

(56) References Cited

U.S. PATENT DOCUMENTS

| | | |
|---|---|---|
| 7,401,731 B1 | 7/2008 | Pletz et al. |
| 7,430,521 B2 | 9/2008 | Walker et al. |
| 8,458,016 B1 | 6/2013 | Medina, III et al. |
| 2004/0238622 A1 | 12/2004 | Freiberg |
| 2005/0234773 A1 | 10/2005 | Hirst et al. |
| 2007/0156530 A1 | 7/2007 | Schmitt et al. |
| 2007/0288372 A1 | 12/2007 | Behar et al. |
| 2008/0133325 A1 | 6/2008 | De Sruba et al. |

(Continued)

OTHER PUBLICATIONS

"MasterCard Benefit Optimizer" video (published by MasterCard on Feb. 2, 2017 at https://www.youtube.com/watch?v=_PbO40g-VUk - hereinafter "MasterCard Benefit Optimizer") (Year: 2017).*

(Continued)

*Primary Examiner* — James M Detweiler
(74) *Attorney, Agent, or Firm* — Armstrong Teasdale LLP

(57) ABSTRACT

A payment card benefit assessment system and method includes a computing device accepting payment card benefit catalog information from a payment card issuer and payment card transaction data from a payment card processing network. The payment card transaction data is analyzed to group cardholders into one demographic clusters and to determine an estimated benefit value for each of the demographic clusters. Individualized payment card benefit options are presented to an individual cardholder based on the individual cardholder's payment card transactions and the determined estimated benefit value for a corresponding one of the plurality of demographic clusters.

23 Claims, 8 Drawing Sheets

(56) References Cited

U.S. PATENT DOCUMENTS

| | | | | |
|---|---|---|---|---|
| 2011/0106607 A1* | 5/2011 | Alfonso | ............. | G06Q 30/0224 |
| | | | | 705/14.25 |
| 2015/0161645 A1* | 6/2015 | Unser | ................ | G06Q 30/0226 |
| | | | | 705/14.27 |
| 2016/0307224 A1* | 10/2016 | Eun | .................... | G06Q 30/0226 |
| 2016/0350792 A1* | 12/2016 | Rajappa | ............. | G06Q 30/0236 |
| 2020/0118155 A1* | 4/2020 | Bloy | ...................... | G06Q 40/00 |

OTHER PUBLICATIONS

"Analyzing Credit Card Purchase Patterns using clustering" (Sharma, Dhruv; published on Sep. 27, 2019 on https://towardsdatascience.com) (Year: 2019).*

"Millennials and Money: The Unfiltered Journey", Internet Article, Jan. 25, 2016, Facebook IQ, Facebook for Business, 11 pages, Accessed Online at URL: https://www.facebook.com/business/news/insights/millennials-money-the-unfiltered-journey.

* cited by examiner

PAYMENT CARD BENEFIT VALUE ESTIMATOR SYSTEM AND METHOD WITH TRANSACTION-BASED INDIVIDUAL CARDHOLDER RELEVANCE OF SELECTABLE BENEFITS

BACKGROUND

This disclosure relates generally to electronic payment card systems, and more specifically to electronic payment card systems allowing individual cardholders to selectively optimize payment card benefits in view of individual payment card history and an estimated value of payment card benefits to similarly situated cardholders.

Payment cards including credit, debit and prepaid cards are in widespread use as a convenient form of payment for goods and services. In an increasingly competitive market, a number of different benefits are offered by different payment card issuers to existing and prospective cardholders, or different benefits are offered in relation to different payment cards of the same issuer. Such payment card benefits may include cash back rewards for eligible purchases, redeemable points that may be credited to transactions with identified merchants or for predetermined goods or services, travel insurance coverage, rental car insurance coverage, identity theft insurance coverage, warranty coverage for eligible purchased products, discounts for specific goods and services from selected merchants, etc. These and other benefits have been well-received by certain cardholders.

Conventionally, payment card benefits are decided by card issuers and offered to cardholders as a group such that each accepting cardholder in the group has identical payment card benefits. An increasing number of persons, however, feel that card issuers do not understand their individual needs. A perceived lack of relevance of certain payment card benefits to some individual cardholders, a perceived lack of value in the payment card benefits being offered, as well as the perceived inflexibility of payment card benefit offerings by payment card issuers to meet particular needs of cardholders, may reinforce the notion that issuing banks are out of touch with their customer base. If not corrected, goodwill between existing and prospective cardholders and issuing banks of payment cards may continue to deteriorate, and accompanying cardholder attrition may be expected. Improvements are desired.

BRIEF DESCRIPTION

In one aspect, the disclosure provides a payment card benefit assessment system including a payment card benefit selection computing device in communication with a cardholder database storing a portfolio of payment card account information for at least one payment card issuer, the payment card benefit selection computing device. The computing device is configured to: accept payment card benefit catalog information from the at least one payment card issuer; receive payment card transaction data from a payment card processing network for payment card transactions made by payment card accounts in the portfolio; analyze the received payment card transaction data to group respective cardholders associated with the portfolio into one of a plurality of demographic clusters; determine, based on the accepted payment card benefit catalog information and the analyzed payment card transaction data, an estimated benefit value for each of the plurality of demographic clusters; and present at least one individualized payment card benefit option to an individual cardholder based on the individual cardholder's payment card transactions and the determined estimated benefit value for a corresponding one of the plurality of demographic clusters.

In another aspect, the disclosure provides a method for electronically assessing payment card benefits. The method is implemented with at least one host computing device having at least one processor in communication with a database storing a portfolio of payment card account information for at least one payment card issuer. The method includes: accepting payment card benefit catalog information from the at least one payment card issuer; receiving payment card transaction data from a payment card processing network for payment card transactions made by payment card accounts in the portfolio; analyzing, by the at least one host computing device, the received payment card transaction data to group respective cardholders associated with the portfolio into one of a plurality of demographic clusters; determining, by the at least one host computing device and based on the accepted payment card benefit catalog information and the analyzed payment card transaction data, an estimated benefit value for each of the plurality of demographic clusters; and presenting at least one individualized payment card benefit option to an individual cardholder based on the individual cardholder's payment card transactions and the determined estimated benefit value for a corresponding one of the plurality of demographic clusters.

In another aspect, the disclosure provides a non-transitory computer-readable media having computer-executable instructions embodied thereon for assessing payment card benefits. When executed by at least one processor in communication with a database storing a portfolio of payment card account information for at least one payment card issuer, the computer-executable instructions cause the processor to: accept payment card benefit catalog information from the at least one payment card issuer; receive payment card transaction data from a payment card processing network for payment card transactions made by payment card accounts in the portfolio; analyze the received payment card transaction data to group respective cardholders associated with the portfolio into one of a plurality of demographic clusters; determine, based on the accepted payment card benefit catalog information and the analyzed payment card transaction data, an estimated benefit value for each of the plurality of demographic clusters; and present at least one individualized payment card benefit option to an individual cardholder based on the individual cardholder's payment card transactions and the determined estimated benefit value for a corresponding one of the plurality of demographic clusters.

DETAILED DESCRIPTION OF THE DISCLOSURE

Figure 1:
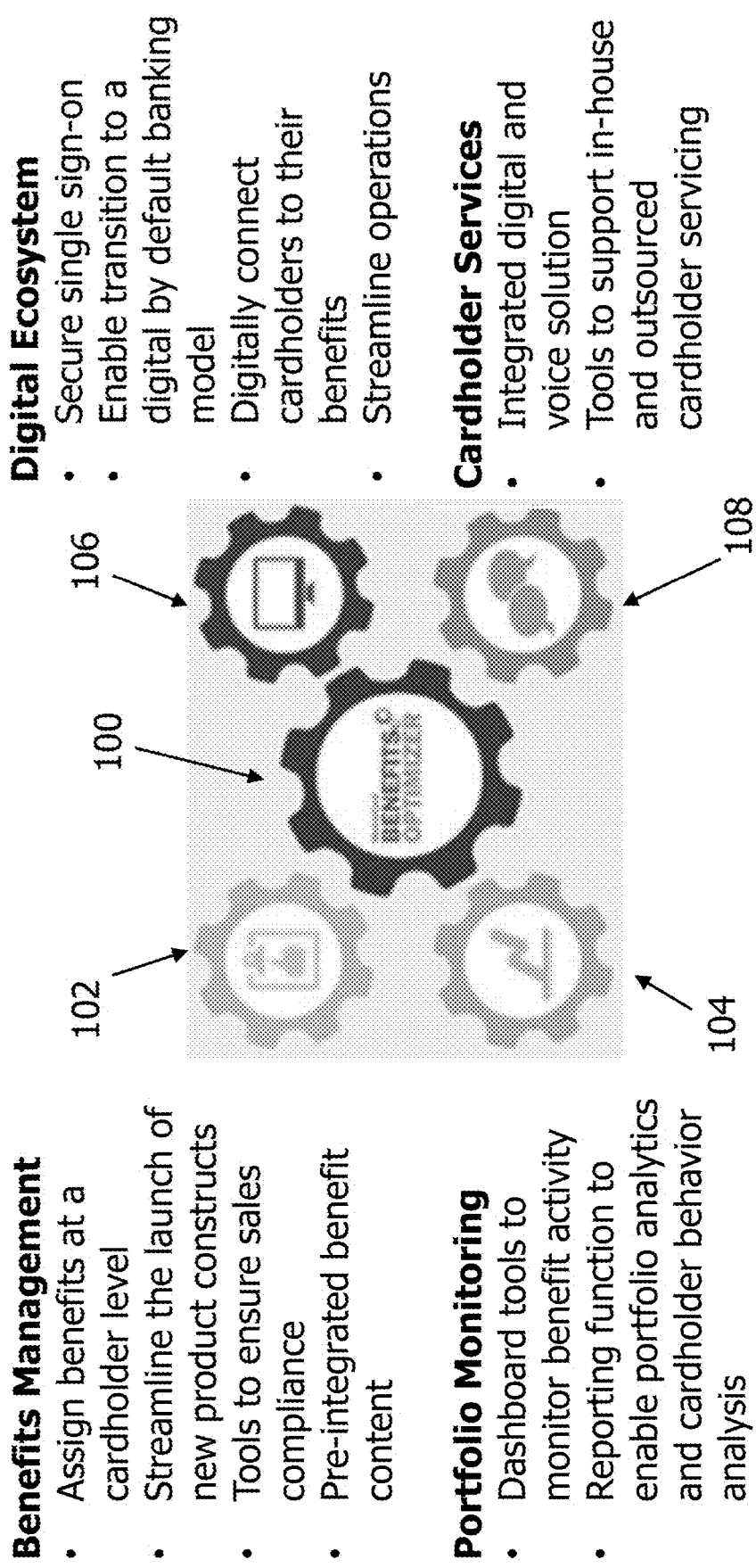
FIG. 1 is a schematic diagram illustrating a computer-implemented payment card benefit evaluation system as a hub of payment card benefit services to cardholders and payment card issuers.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure.

The system and methods of the disclosure as described below are configured to address certain problems and challenges regarding payment card systems and associated payment card benefits from a card issuer perspective and a cardholder perspective. As noted above, payment cards are typically offered with a benefit package selected by the card issuer and offered to cardholders as a group. While the benefits in the package are typically selected to broadly appeal to large groups in the cardholder base, in many instances a number of problems are presented.

For example, certain cardholders face practical challenges in understanding what their payment card benefits actually are, and also how and when to effectively use them. While card issuers do make benefit information available, busy or inattentive cardholders may or may not fully comprehend the information provided, and over time cardholders may simply forget the particular benefits provided, or particular instructions regarding how to use them. Cardholders carrying multiple payment cards are even further challenged to understand the different sets of benefits applying to different payment cards. More effective cardholder education tools are desired to help cardholders better understand their cardholder benefits.

Certain cardholders may likewise be primarily attracted to a single benefit (e.g., cash back rewards or redeemable points) and may pay little or no attention to other benefits that accompany them in any given payment card. Cardholders of this type may be quick to move from one payment card to another payment card, or from one card issuer to another, when a better offer arises in their payment card benefit of primary interest. For example, a cardholder who currently holds a payment card with a 1.5% cash back award may not hesitate to cancel her present payment card and obtain a new payment card offering a 2% cash back award. Transient benefit shoppers and frequent payment card switching detracts from customer relationships and imposes costs and inconvenience to both cardholder and payment card issuers in opening and closing accounts. In certain cases, cardholders that overemphasize certain benefits in selecting a payment card may not actually obtain the best value overall.

More effective evaluation tools are desired to help cardholders assess combinations of payment card benefits to make better informed decisions.

Related to the points above, certain cardholders may lack even a good understanding of the value of payment card benefits made available to them. For instance, a cardholder may subjectively not consider herself a frequent traveler that would meaningfully benefit from travel benefits and rental car insurance, even though the cardholder does occasionally travel and also occasionally rents a car. The actual savings that such benefits may provide over the course of time may simply be lost on such a cardholder and as such the benefits may be generally unappreciated. A frequent traveler may likewise find apparent value in similar benefits, but may lack specific awareness of how much the benefits may save over time. Finally, certain cardholders may simply not realize that certain benefits apply at all to their use of the payment card and do save them money, or would save them money if applied in an informed manner by the cardholder. If cardholders better understood how the benefits actually apply (or not) to their actual use of the payment card, and also the value presented by those benefits, banking relationships may be improved. Effective assessment tools are desired to help cardholders objectively assess the value presented by payment card benefits.

Also related to the points above, certain payment card benefits offered by card issuers actually are not particularly relevant to certain cardholders. As one example, a cardholder who does not travel, or very infrequently travels, probably does not stand to meaningfully benefit from travel insurance. Likewise, a cardholder who simply does not rent a car, or does so very infrequently, probably does not stand to meaningfully benefit from rental car benefits. For such cardholders, an inclusion of such benefits in group offering of payment cards by card issuers may contribute to the feeling that banks do not understand their actual needs. Again, if not corrected, customer relationships may suffer between cardholders and payment card issuers, or in some cases potential customers will simply decline payment cards and fail to establish a banking relationship at all. Effective payment card benefit selection tools are desired to help cardholders objectively assess payment card benefits in relation to their actual use of their payment cards in order to determine the most relevant benefits.

Offerings of payment card benefits are also typically limited by card issuers in a manner that may not be a good fit for certain cardholders. Because of this, existing or potential cardholders may not easily find the combination of benefits that they most desire in a single payment card, and as a result they tend to have to compromise in selecting a card with payment card benefits in mind. In some cases, cardholders obtain and carry multiple payment cards having different benefits to use in different transactions to try to use payment card benefits in the most beneficial manner. Of course, cardholder success in effectively utilizing multiple payment cards offering different benefits may or may not be realized. Practical tools are needed that enable cardholders to more effectively select payment card benefits, assess the value of the benefits that they have, and determine if a more optimal use of payment card benefits is possible.

In some cases, cardholders have some choice in payment card benefits at the time of account creation, but thereafter lack practical options to change their payment card benefits or to activate new benefits on existing payment cards. Instead, card issuers typically issue a new payment card with different or additional benefits to cardholders that desire them. In instances wherein payment cards are auto-debited as payment for various different consumer accounts, resetting all of the consumer accounts with the new payment account information is inconvenient. Tools allowing cardholders to change payment card benefits on an existing card would be desired, and tools allowing issuers to reduce having to reissue cards would likewise be beneficial.

Finally, a growing population of users is increasingly accepting of on-line, digital robo-advisors and systems as an alternative to human consultants to receive input and obtain advice on financial matters. Such robo-advisors operate to process data according to algorithmic rules to assess account status, indicate financial performance, intelligently make recommendations or provide educational tools for consideration by customers. Such on-line robo-advisors may be accessed round the clock via user computing devices and may be accessed on demand by users with great convenience. Such on-line robo-advisors to assist cardholders in making payment card benefit selections, or in making recommendations for payment card benefits, generally do not exist to help cardholders make informed choices in an individualized manner. Robo-advisor tools would be welcomed by cardholders and would improve goodwill between payment card issuers and cardholders.

An online, computer-implemented system and method of the disclosure provides a solution for selecting a payment card benefit feature that addresses these and other problems. The computer-implemented system and method of the disclosure allows cardholders to optimally select add-on benefit features to their credit, debit and prepaid cards based on the relevance of the benefit feature available to their actual use of the payment card, as well as to a correlation in cardholder demographics and historical transaction behavior relative to other similarly situated cardholders. The system and method of the disclosure likewise provides a payment card benefit feature selection solution allowing consumers to select payment card benefit features in view of the potential estimated value of the benefit feature set for the cardholder.

As such, the system and method of the disclosure provides a payment card benefit selection solution that features self-selection of the most optimal benefit set and/or a recommendation of optimal benefit features based on demographics and historical behavior of cardholders in view of their own payment card transaction data as processed by a payment card processing system. In an educated and informed manner, cardholders may self-select specific payment card benefits from options made available by an issuer. Payment card benefit selections may be made as bundled payment card benefits, as well as a la carte payment card benefit selection.

The system and method of the disclosure accordingly provides an effective cardholder engagement platform, enabling payment card issuers to deliver Consumer Value Propositions (CVP) at an individual card level. Cardholders are afforded more choice and transparency to assess payment card benefit relevancy and value of available payment card benefit options. Cardholders may accordingly select benefits which best meet their individual needs, as well as purchase additional features and benefits to fulfil unmet needs or accommodate changing circumstances, without necessarily having to acquire a new card.

In turn, the system and method of the disclosure affords greater flexibility to payment card issuers in their benefit offerings, greater visibility to actual cardholder preferences, insights regarding cardholder behavior and effect of specific payment card benefits, and content publishing capability to educate cardholders and manage awareness of benefits. Practical yet meaningful tools are provided to enhance cardholder engagement and provide a more profitable cardholder platform. Card issuers may likewise more efficiently allocate computer resources in view of actual cardholder behavior to improve network processing speed and enhanced application of benefits that apply to the most cardholders. The system and method of the disclosure may be self-learning in some aspects and anticipate cardholder needs, preferences and behavior with respect to payment card benefits and other factors. That is, the system and method of the disclosure may include machine learning and/or artificial intelligence techniques that are described further herein below In one embodiment, the disclosure provides a payment card benefit assessment system including a payment card benefit selection computing device in communication with a cardholder database including a portfolio of payment card account information for at least one payment card issuer, the payment card benefit selection computing device. The computing device is configured to: accept payment card benefit catalog information from the at least one payment card issuer; receive payment card transaction data from a payment card processing network for payment card transactions made by payment card accounts in the portfolio; analyze the received payment card transaction data to group respective cardholders associated with the portfolio into one of a plurality of demographic clusters; determine, based on the accepted payment card benefit catalog information and the analyzed payment card transaction data, an estimated benefit value for each of the plurality of demographic clusters; and present at least one individualized payment card benefit option to an individual cardholder based on the individual cardholder's payment card transactions and the determined estimated benefit value for a corresponding one of the plurality of demographic clusters.

Optionally, the payment card benefit selection computing device may further configured to accept payment card benefit data from a third party device, and group cardholders in the cardholder database into the plurality of demographic clusters based on the accepted payment card benefit data and the analyzed transaction data.

The payment card benefit selection computing device may be configured to: identify at least one themed bundle of payment card benefits as a recommended set of payment card benefits to the individual cardholder; identify at least one tiered bundle of payment card benefits as a recommended set of payment card benefits to the individual cardholder; provide a plurality of payment card benefit options for self-selection by the individual cardholder; offer at least one add-on fee-based payment card benefit option to the individual cardholder; and/or make available at least one merchant rewards or merchant loyalty program option to the individual cardholder. The payment card benefit selection computing device may likewise be configured to: receive an acceptance of at least one individualized payment card benefit option from the individual cardholder; and store the acceptance of at least one individualized payment card benefit option from the individual cardholder for application to eligible payment card transactions made by the individual cardholder subsequent to acceptance.

The payment card benefit selection computing device may also be configured to analyze cardholder behavior of a plurality of individual cardholders associated with the portfolio to assess a correlation between payment card transaction activity and payment card benefit selections made by the individual cardholders. The payment card benefit selection computing device may be configured to provide at least one dashboard tool to the at least one payment card issuer to monitor payment card benefit activity across the portfolio. The payment card benefit selection computing device may also be configured to generate a self-organizing map including the demographic clusters and estimated benefit values for the portfolio.

In another embodiment, the disclosure provides a method for electronically assessing payment card benefits. The method is implemented with at least one host computing device having at least one processor in communication with a database including a portfolio of payment card account information for at least one payment card issuer. The method includes: accepting payment card benefit catalog information from the at least one payment card issuer; receiving payment card transaction data from a payment card processing network for payment card transactions made by payment card accounts in the portfolio; analyzing, by the at least one host computing device, the received payment card transaction data to group respective cardholders associated with the portfolio into one of a plurality of demographic clusters; determining, by the at least one host computing device and based on the accepted payment card benefit catalog information and the analyzed payment card transaction data, an estimated benefit value for each of the plurality of demographic clusters; and presenting at least one individualized payment card benefit option to an individual cardholder based on the individual cardholder's payment card transactions and the determined estimated benefit value for a corresponding one of the plurality of demographic clusters.

Optionally, the method may also include: accepting payment card benefit data from a third party device; and grouping, by the at least one host computing device, cardholders in the cardholder database into the plurality of demographic clusters based on the accepted payment card benefit data and the analyzed transaction data.

The method may include: identifying, by the at least one host computing device, at least one themed bundle of payment card benefits as a recommended set of payment card benefits to the individual cardholder; identifying, by the at least one host computing device, at least one tiered bundle of payment card benefits as a recommended set of payment card benefits to the individual cardholder; providing, by the at least one host computing device, a plurality of payment card benefit options for self-selection by the individual cardholder; offering, by the at least one host computing device, at least one add-on fee-based payment card benefit option to the individual cardholder; and/or making available, by the at least one host computing device, at least one merchant rewards or merchant loyalty program option to the individual cardholder. The method may likewise include: receiving, by the at least one host computing device, an acceptance of at least one individualized payment card benefit option from the individual cardholder; and storing the received acceptance of at least one individualized payment card benefit option from the individual cardholder for application to eligible payment card transactions made by the individual cardholder subsequent to acceptance.

The method may also include: analyzing, by the at least one host computing device, cardholder behavior of a plurality of individual cardholders associated with the portfolio to assess a correlation between payment card transaction activity and payment card benefit selections made by the individual cardholders; providing at least one dashboard tool to the at least one payment card issuer to monitor payment card benefit activity across the portfolio; and/or generating a self-organizing map including the demographic clusters and estimated benefit values for the portfolio.

The technical problems addressed by the payment card benefit assessment systems and methods of the disclosure include at least one of: (i) limitations of individual cardholders to quickly or accurately assess a relative value of a plurality of payment card benefits offered by cardholders in view of actual payment card use; (ii) limitations of card issuers to correlate payment card benefits to an individual cardholder to provide a timely estimated value of benefits; (iii) inability of cardholders to quickly or accurately assess an individualized relevance of particular payment card benefits being offered by payment card issuers; (iv) inability of card issuers to truly understand correlation of payment card benefits to actual cardholder behavior to assess payment card benefit demand; (v) inability of cardholders to customize payment card benefits, modify payment card benefits, or add new benefits on an existing payment card; (vi) inability of card issuers to provide payment card benefit flexibility to individual cardholders in new and existing cardholder accounts; (vii) lack of payment card benefit recommendation tools at an individual cardholder level; and (viii) inability of card issuers to effectively monitor and visualize payment card benefit activity and compare cardholders across a portfolio of payment card accounts.

The online payment card benefit assessment systems and methods of the disclosure may be implemented using computer programming or engineering techniques including computer software, firmware, hardware, or any combination or subset thereof, wherein the technical effects may be achieved by (i) providing electronic tools allowing individual cardholders to effectively understand relative value of a plurality of payment card benefits offered by card issuers by leveraging actual payment card transaction date of individual cardholders as compared to demographically similar cardholders based on payment card transaction data across a portfolio of payment card accounts; (ii) providing electronic tools to payment card issuers allowing correlation of payment card benefits to an individual cardholder to provide an estimated value of a plurality of benefits; (iii) leveraging actual payment card transaction data and providing feedback to cardholders allowing them to understand an individualized relevance of particular payment card benefits being offered by payment card issuers; (iv) leveraging actual payment card transaction data card and providing feedback card issuers allowing them to better understand correlation of payment card benefits to actual cardholder behavior; (v) enabling cardholders to modify payment card benefits or add new benefits on an existing payment card in an informed manner; (vi) enabling card issuers to provide payment card benefit flexibility in new and existing cardholder accounts; (vii) providing automated benefit recommendation tools at an individual cardholder level; and (viii) providing automated tools for card issuers to effectively monitor and visualize payment card benefit activity and compare cardholders across a portfolio of payment card accounts.

The resulting technical benefits achieved by the online payment card benefit assessment systems and methods of the disclosure include at least one of: (i) improved online communication and educational tools accessible on demand for individual cardholders to more readily understand relative value of a plurality of payment card benefits offered; (ii) improved online tools allowing payment card issuers to quickly generate estimated value of a plurality of benefits on an individual cardholder level; (iii) improved online communication and educational tools accessible on demand for individual cardholders to more readily understand an individualized relevance of particular payment card benefits being offered by payment card issuers; (iv) improved online tools allowing payment card issuers to understand correlation of payment card benefits to actual cardholder behavior; (v) improved options allowing cardholders to optimized payment card benefits in a customized manner, including modification of benefits addition of new benefits on an existing payment card in an efficient and informed manner; (vi) accommodation of desired payment card benefit flexibility in new and existing cardholder accounts by card issuers with reduced instances of having to provide replacement payment cards; (vii) implementation of automated digital robo-advisor payment card benefit recommendation tools at an individual cardholder level to improved cardholder engagement; and (viii) implementation of automated tools for card issuers to effectively monitor and visualize payment card benefit activity and compare cardholders across a portfolio of payment card accounts.

In one embodiment, a computer program is provided, and the program is embodied on a computer-readable medium. In an example embodiment, the system may be executed on a single computer system, without requiring a connection to a server computer. In a further example embodiment, the system may be run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, machine learning programs may be trained by inputting sample data sets or certain data into the programs, such as images, object statistics and information, payment card data, cardholder data, and preference data. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing— either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the object, vehicle, user, damage, needed repairs, costs and/or incident from vehicle data, insurance policies, geolocation data, image data, and/or other data.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, any type of virtual card (e.g. virtual cards generated by issuers and/or third party processors via mobile bank or desktop apps) and/or any other device that may hold payment account information, such as mobile phones, Smartphones, personal digital assistants (PDAs), key fobs, digital wallets, smart devices (i.e., smart TV) and/or computers. Each type of transactions card can be used as a method of payment for performing a transaction. As used herein, the term "payment account" is used generally to refer to the underlying account with the transaction card. In addition, cardholder card account behavior can include but is not limited to purchases, fund transfer, personal payment, management activities (e.g., balance checking), bill payments, achievement of targets (meeting account balance goals, paying bills on time), and/or product registrations (e.g., mobile application downloads).

As used herein, the term "transaction data" refers to data that includes at least a portion of a cardholder's account information (e.g., cardholder name, account identifier, credit line, security code, and/or expiration data) and at least a portion of purchase information (e.g., price, a type of item and/or service, SKU number, item/service description, purchase date, and/or confirmation number) supplied by a merchant from which the cardholder is making a purchase.

The methods and systems described below enable optimal payment card benefit assessment and optimization strategies via an online system and method including portfolios of payment card account information for at least one payment card issuer across a number of different payment card issuers, accessible by individual cardholders and card issuers to better understand relative values of payment card benefits as compared across the cardholders in the portfolio in view of actual payment card transaction data.

FIG. 1 is a schematic diagram illustrating a computer-implemented payment card benefit evaluation system 100 as a hub of payment card benefit services to cardholders and payment card issuers. As shown, the payment card benefit services include benefits management services 102, portfolio monitoring services 104, digital ecosystem services 106, and cardholder services 108.

Benefits management services 102 includes benefit selection services, including benefit valuation and recommendation services, and benefit assignment services at an individual cardholder level as further described below. Benefits management services 102 includes administration of available benefit options, benefit bundles, and add-on benefit options based on benefit catalog data and information received from each participating card issuer. Payment card benefit content may be presented to individual cardholders via benefit management services 102 on an issuer-by-issuer basis to existing or prospective cardholders of each respective issuer. Benefit management services 102 streamlines the launch of benefits with pre-integrated content and tools to ensure sales compliance. Benefit management services 102 also includes appropriate definitional terms and explanation of benefit coverage for reference by individual cardholders to make benefit selection decisions or to refresh their working knowledge of existing benefits.

Portfolio monitoring services 104 includes dashboard tools and the like for the benefit of participating card issuers to monitor benefit activity with respect to portfolios of cardholder accounts. Reporting functions are also included in portfolio monitoring services 104 to enable portfolio analytics and cardholder behavior analysis. Via portfolio monitoring services 104, card issuers may assess the performance of benefits offered and made available via benefits management services 102. Information from portfolio monitoring services 104 may be used by card issuers to refine its benefit offerings based on actual usage over time across portfolios of payment card accounts.

Digital ecosystem services 106 provides secure digital sign-on services, manages transitions between services 102, 104 and 108, accommodates various banking models of participating issuers, connects cardholders to benefits, and streamlines cardholder and card issuer operations in performing the services described.

Cardholder services 108 implements digital and voice interfaces for cardholder interaction, and tools so support in-house servicing on a per-issuer basis or to outsource cardholder servicing operations as may be desired.

Figure 2:
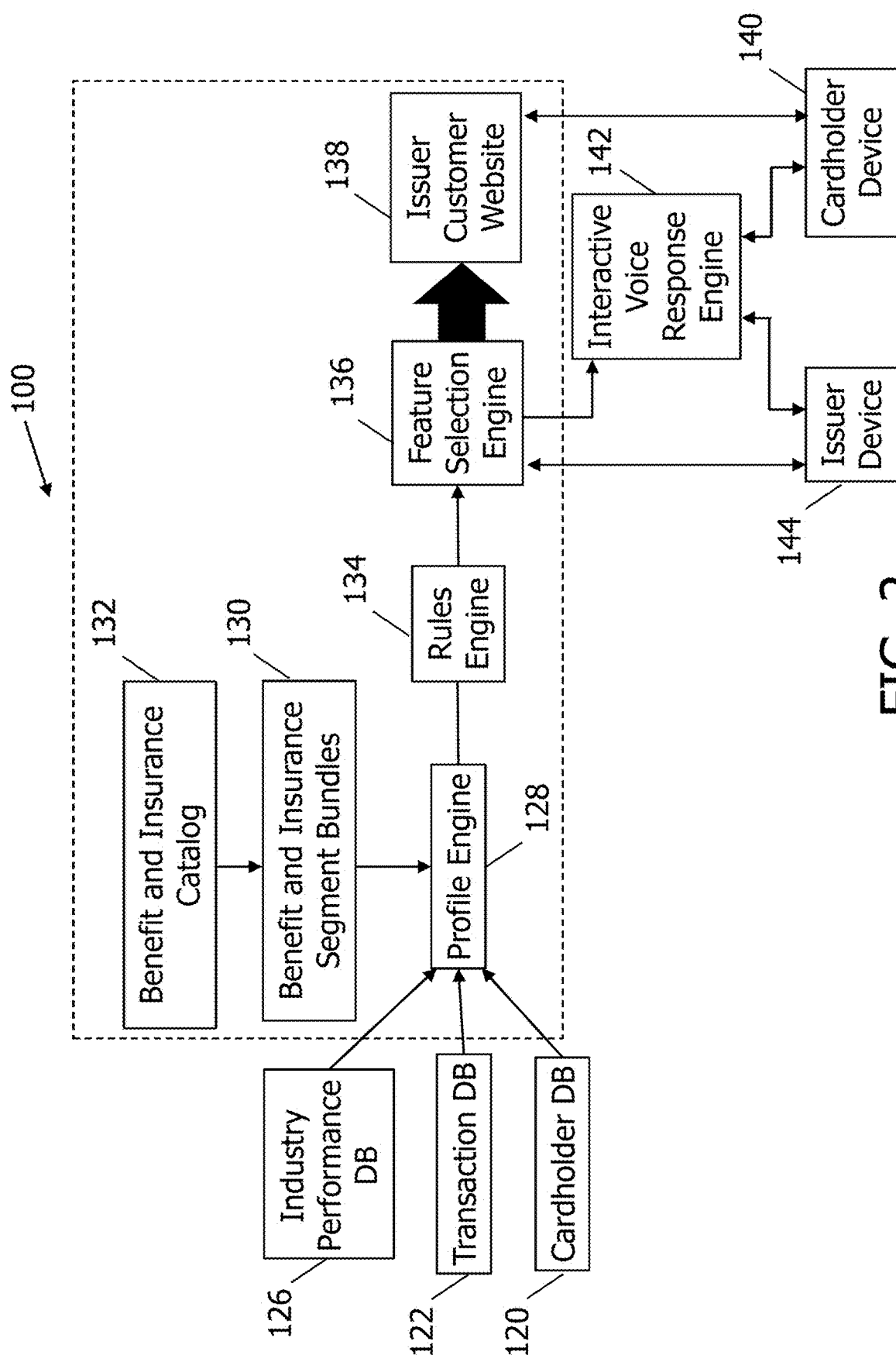
FIG. 2 illustrates an operational schematic diagram for the payment card benefit evaluation system shown in FIG. 1.

FIG. 2 illustrates an operational schematic diagram for the payment card benefit evaluation system 100 shown in FIG. 1.

The payment card benefit evaluation system 100 incorporates profiling of cardholders via collected or received demographic data from a customer/cardholder database 120, transaction data from standard card processing of payment card transactions in a transaction database 122, and industry performance data related to claims, reward programs and card services in industry performance database 126.

A profiling engine 128, based on the inputs from databases 120, 122 and 126, groups or clusters cardholders into segments based on their respective payment card transaction behaviors and demographics. Cardholder clusters may be grouped by the profiling engine 128 around transactions conducted with the same or similar merchants, industries, frequency and spend amounts as well as age, location and gender data. The cluster groups generated by the profiling engine 128 align with specific sets or bundles of recommended benefit and card features 130 that are most relevant for the cardholders in each cluster from a larger set of benefit options offered by each participating card issuer via a benefit catalog 132. Industry performance data is used to quantify the potential estimated value of utilizing the recommended benefit features to the clustered cardholders. The profiling engine 128 processes a portfolio of cardholder accounts according to a rules engine 134 for the benefit of a feature selection engine 136 accessible by individual cardholders via a portal such as a card issuer customer website 138.

Individual cardholders, when logging into the card issuer website 138 or a separately provided banking app via a cardholder device 140 will be notified of the option to select their card benefits and features. The selection options presented to each cardholder will be based on the cluster produced by the profiling engine 128 that each individual cardholder aligns with according to the rules engine 134. The cardholder then opts-in to their desired benefit features from the specially identified list of options tailored to them.

The tailored benefit options include estimated benefit values of the most relevant benefits based on the similarly situated cardholders in the cluster that the cardholder best aligns with. For example, the estimated value may be based on the average number of transactions made by cardholders in the cluster for each benefit in a desired timeframe.

Interactive voice response components 142 may be included for voice interaction with a cardholder via the cardholder device 140. Issuer devices 144 may also directly interface with the feature selection engine 136 and interactive voice response components 142 to assist cardholders through the benefit selections, recommendations and estimated value selection criteria.

The exemplary system 100 shown in FIG. 2 contemplates three main subsystems, namely a Cardholder Profiling Engine 128, a Feature Selection Engine 136, and an Issuer Web/Mobile Application 138. The system 100 may alternatively include greater or fewer than the three main subsystems described, and may be implemented in various different system architectures while otherwise providing similar benefits to cardholders and card issuers.

In the Cardholder Profiling Engine 128, cardholder data models are based on analyzed data sets related to cardholder behavior such as transactional spend/purchase behavior with different merchants, dollar amount of transaction, card type and purchase date. The cardholder data models are further based on cardholder attributes such as age, gender, and residential city and state. Demographic data for cardholders may pre-exist and be incorporated in the system 100 or may be separately supplied or accepted by the system 100. The cardholder data models are additionally based on industry performance data such as reward program earning rates (e.g. $0.01 per dollar in spend, 2× point earnings for travel purchases, etc.), historical claims data (i.e. percent of transactions that result in a claim, percent of cards that have a ID theft incidence, etc.), card services cost (e.g. cost for direct purchase of concierge services, cost for direct purchase of wireless connections at airports, etc.)

The Feature Selection Engine 136 manages the delivery, assignment and servicing of cardholder benefits in a digital ecosystem. The Feature Selection Engine 136 features primary account number-level (PAN-level) benefit assignment and delivery to individual cardholders. The Feature Selection Engine 136 facilitates cardholder selection of individual benefits or of bundles of benefits in either an issuer pay or consumer pay model. The Feature Selection Engine 136 also implements an Issuer-branded cardholder web portal to provide a digital channel for cardholder self-servicing, including delivery of cardholder benefit bundles, benefit self-selection and benefit upsells. The Feature Selection Engine 136 also provides a servicing tool to enable call center or branch agents to service cardholders directly.

The Feature Selection Engine 136 likewise provides business intelligence reporting to enable issuers to review activity and gain insights into their payment card portfolios; an integration and data management hub to enable benefit activation, management, and servicing; and call center integration to enable seamless cardholder benefit servicing.

In addition to its use as a hub for display and interaction with cardholders concerning benefits, different benefit selection models are supported by the Feature Selection Engine 136 for enhanced cardholder engagement and flexibility. For example, a themed selection model may be implemented wherein a bundle of benefits is organized around a consumer affinity, such as travel or home assistance. The consumer than can select one or more of themed bundles for their payment card. A tiered selection model may also be implemented wherein issuers provide a base level of benefits and cardholders can top up or add to the base level of benefits in lieu of purchasing a benefit bundle with a richer set of benefits. A self-select model may also be implemented wherein cardholders are allowed to select a configurable number of individual benefits from a catalog curated by the issuer. A fee based model is also contemplated wherein consumers may further enhance their card by purchasing individual benefits to apply to their payment card.

The system 100 also allows benefit rewards programs, including merchant cobrand programs, to be packaged as a benefit in the models executed by the Feature Selection Engine 136. This enables much more robust choice on the part of cardholders, as they can in real time change the cobrand, or cobrands, associated with their card product. Allowing cardholders to participate in more than one merchant loyalty program, and allowing cardholders to change their loyalty programs whenever they choose to, may be beneficially accommodated in a single card, without requiring issuers to issue new cards.

In issuer programs where more than one cobrand is allowed, the system 100 allows individual cardholders to configure what percentage of their earn is applied to each program. For example, a cardholder can choose to apply 50% of eligible purchases to a first loyalty program of a first merchant, and to apply 50% of eligible purchases to a second loyalty program of a second merchant. In such manner the consumer/cardholder has full control over their card, and the back end of the system 100 ensures that the economics of the card from an issuer perspective do not change, regardless of consumer choice.

As one example, a High-end Frequent Travel Bundle Option may include the following payment card benefits: concierge service, trip cancellation insurance, rental car/collision damage waiver insurance, lost or damaged baggage insurance, travel assistant services, ticket saver features, and airport lounge access.

As another example, an Everyday Spender Bundle Option may include the following payment card benefits: identity theft alert, price protection, extended warranty, mobile phone insurance, and free two-day shipping, As another example, a Frequent Business Traveler Bundle Option may include the following payment card benefits: trip cancellation insurance, rental car/collision damage waiver insurance, lost or damaged baggage insurance, travel assistant services, ticket saver features, and airport lounge access, roadside assistance, and Wifi Access.

As another example, a High-end Consumer Electronics Bundle Option may include the following payment card benefits: price protection, extended warranty and free two-day shipping.

The Issuer Web/Mobile Application 138, in addition to using the provided consumer experience for CVP configuration, allows an issuer to leverage a robust set of APIs to embed that capability within their existing web and mobile experiences. Issuers can use their own presentation, conforming to their own brand standards, while gaining the full functionality of the middle office and back office capabilities of the system and method of the disclosure.

Figure 3:
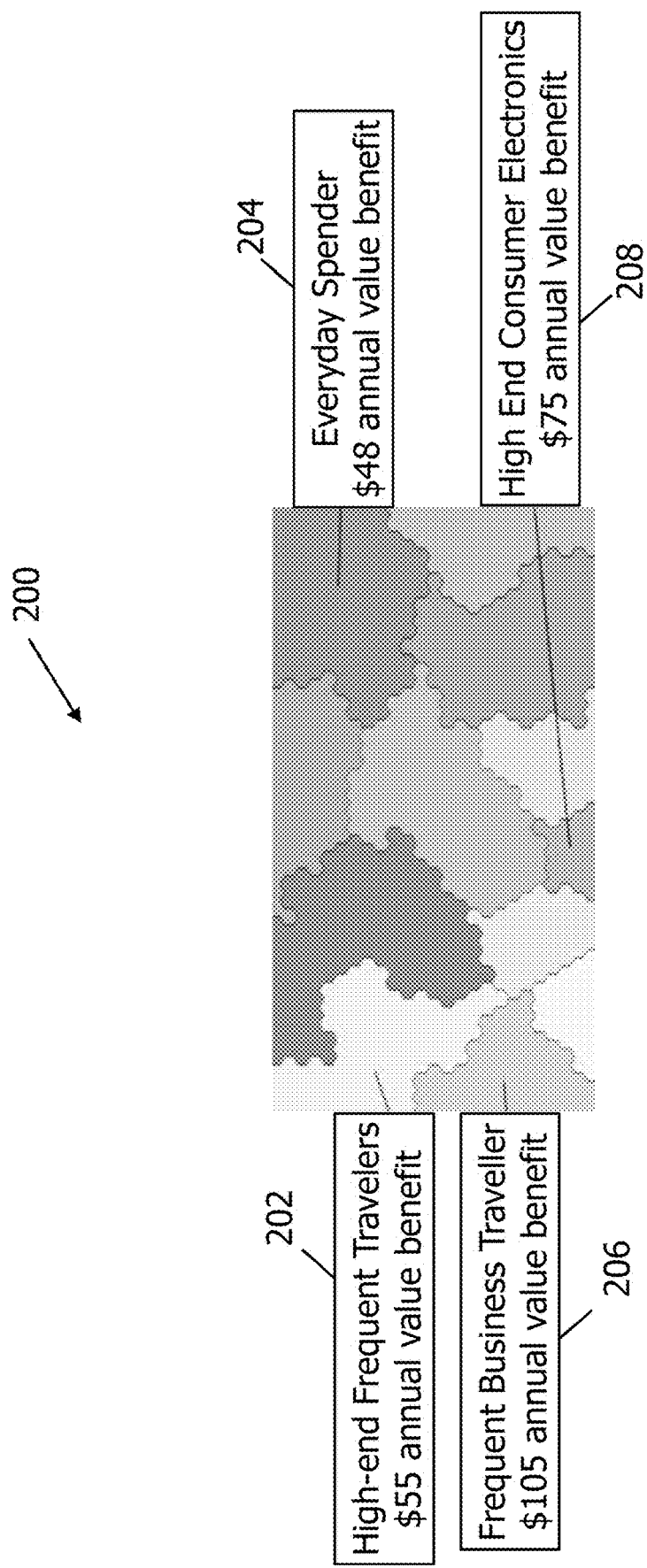
FIG. 3 illustrates an exemplary self-organizing cardholder profile map including estimated payment card benefit value produced by the payment card benefit evaluation system shown in FIGS. 1 and 2.

As shown in FIG. 3, the system 100 (shown in FIG. 1) of the disclosure includes visualization tools such as cluster map 200 meant as a visual representation of customer information mapping based on the possible data models in the Cardholder Profiling Engine 128 (shown in FIG. 1), including but not limited to data models that result from machine learning techniques. This Self Organizing Map (SOM) approach places customers/cardholders on a two dimensional map 200 in positions relative to other customers/cardholders, based on similarities and differences in their modelled attributes. The map visually indicates portions of the data structures created by the system allowing a person to more intuitively understand the findings of the system regarding cardholder alignment in specific areas of interest to assess payment card benefits in a reduced amount of time.

Estimated benefit value for cardholders in each cluster is based on utilization of the benefit features in each cluster as compared to the marketplace cost and/or savings quantified from the industry performance data received from industry performance database 126 (shown in FIG. 1). The cluster map 200 provides insight to issuers regarding cardholder behavior correlated to benefits, and the cluster may further be provided in part to individual cardholders as a demonstration of benefit value not only to the individual cardholder, but to other cardholders that are similarly situated. As such, an individual cardholder may be provided information regarding which clusters most clearly apply to their use of the card in view of the transaction history of the particular cardholder.

For example, in the map 200 a first cluster 202 is shown that corresponds to High-end Frequent Travelers based on the transactional and demographic profiling performed by the system 100. For this group of cardholders, the High-end Frequent Travel Bundle Option described above is shown to have an estimated benefit value of $55 per year. Therefore, an individual cardholder that aligns well with this cluster by making a comparable number of trips and transactions that would qualify for these benefits could expect to save about $55 per year if they select the High-end Frequent Travel Bundle Option. By comparing individual cardholder transaction history to the clusters generated, or by knowing which cluster the individual cardholder belongs in, the system 100 may identify a given particular cardholder as a High-end Frequent Traveler and may recommend the High-end Frequent Travel Bundle Option with a notification of the estimated value. As such, a cardholder that would not have self-identified as a High-end Frequent Traveler may see that the High-end Frequent Travel Bundle Option presents actual, practical value to transactions that they are already making.

In the example shown, the map 200 includes a second cluster 204 that corresponds to Everyday Spenders based on the transactional and demographic profiling performed by the system 100. For this group of cardholders, the Everyday Spender Bundle Option described above is shown to have an estimated benefit value of $48 per year. Therefore, an individual cardholder that aligns well with this cluster by making a comparable number of transactions that would qualify for these benefits could expect to save about $48 per year if they select the Everyday Spender Bundle Option. By comparing individual cardholder transaction history to the clusters generated, or by knowing which cluster the individual cardholder belongs in, the system 100 may identify a given particular cardholder as an Everyday Spender and may recommend the Everyday Spender Bundle Option with a notification of the estimated value.

In the example shown, the map 200 includes a third cluster 206 that corresponds to Frequent Business Travelers based on the transactional and demographic profiling performed by the system 100. For this group of cardholders, the Frequent Business Traveler Bundle Option described above is shown to have an estimated benefit value of $105 per year. Therefore, an individual cardholder that aligns well with this cluster by making a comparable number of trips and transactions that would qualify for these benefits could expect to save about $105 per year if they select the Frequent Business Traveler Bundle Option. By comparing individual cardholder transaction history to the clusters generated, or by knowing which cluster the individual cardholder belongs in, the system 100 may identify a given particular cardholder as a Frequent Business Traveler and may recommend the Everyday Frequent Business Traveler Bundle Option with a notification of the estimated value.

In the example shown, the map 200 includes a fourth cluster 208 that corresponds to High End Consumer Products purchasers based on the transactional and demographic profiling performed by the system 100. For this group of cardholders, the High End Consumer Products Bundle Option described above is shown to have an estimated benefit value of $75 per year. Therefore, an individual cardholder that aligns well with this cluster by making a comparable number of trips and transactions that would qualify for these benefits could expect to save about $75 per year if they select the High End Consumer Products Bundle Option. By comparing individual cardholder transaction history to the clusters generated, or by knowing which cluster the individual cardholder belongs in, the system 100 may identify a given particular cardholder as a High End Consumer Products purchaser and may recommend the High End Consumer Products Bundle Option with a notification of the estimated value.

Additional clusters are shown in the exemplary map 200 that include groups of cardholders that are aligned in other aspects according to data models utilized in the profiling engine and for which estimated benefit values may be determined, which the system 100 would identify as a recommended benefit set to a cardholder aligning with those clusters. It is recognized that the same cardholder may be placed in more than one cluster when the profiling is completed. For example, a given individual cardholder may be determined to align with a High-end Frequent Traveler cluster and a High End Consumer Products cluster. The system 100 may accordingly recommend more than one set of benefits to such cardholders.

More than one map may be generated to demonstrate alignment of cardholders, and the maps generated may be customized for particular users to show the most important areas of alignment to specific users. Machine learning techniques may be adopted to generate maps showing anticipated areas of alignment with respective to new benefits, customized maps for existing benefits, or to tailor maps to the interests of specific users such that different users will see different maps when using the system. The maps may be presented in customized graphic user interfaces (GUIs) for different system users.

Exemplary clusters such as those described above, and estimated benefit values associated with each cluster, provide a degree of objectivity to the benefit selection process that conventionally has not existed for most cardholders. Instead of subjective beliefs of cardholders regarding the relevance of benefits offered to their actual lifestyle (e.g., how often they travel, how often they purchase electronics, etc.) that may or may not be accurate, data driven assessments are provided to dispel any errors in thinking regarding how their payment cards are actually used and the direct application of benefits to actual cardholder use. The estimated values further provide a clear basis for cardholders to see the practical effect of the benefits offered for their actual lifestyle.

The clusters further provide opportunity for card issuers to more clearly understand the degree to which benefits are actually being utilized (or not) in portfolios of cardholder accounts, and provide insights to assemble more attractive sets of benefits or to implement new benefits that more closely fit the needs of the clusters as profiled. Such insights may be enhanced via machine learning techniques that may detect patterns and make predictions that may not have been evident to card issuers The clusters also provide tools and insights for the most efficiently allocation of computer resources in the processing of transactions and administration and servicing of payment card accounts. For example, processing power, memory allocation, and network bandwidth may be increased or decreased for certain types of transactions, to more readily accommodate certain types of payment card benefits to improve network speed. Such resources could be allocated, for example, on a card issuer level, on a merchant level, by time of day, by day of week, etc. in view of actual payment card usage data and expected or predicted usage data to improve the system and network operation in view of actual usage demand and other factors.

In general, cardholder benefits to be analyzed by the system and method of the disclosure may include one or more of the exemplary payment card benefit products as shown below in Table 1:

TABLE 1

| Program | Product Name |
| --- | --- |
| Benefit - Service | Account Level Servicing (ALS) |
| Benefit - Service | Airport by Invitation |
| Benefit - Service | Airport Lounge - Lounge Key |
| Benefit - Service | Airport Lounge - Mastercard Airport Experiences (MCAE) |
| Benefit - Service | Airport Lounge - Priority Pass |
| Benefit - Service | Airport Meet & Greet |
| Benefit - Service | Airport Meet & Greet + Chauffeur |
| Benefit - Service | ATM Security Assistance |
| Benefit - Service | Benefits Platform (Pinpoint). Includes Promotional Benefits. |
| Benefit - Service | Boingo Wi-Fi - Prepaid |
| Benefit - Service | Boingo Wi-Fi - Universal + Inflight |
| Benefit - Service | Business Assistance |
| Benefit - Service | Concierge |
| Benefit - Service | Concierge - Brick and Mortar |
| Benefit - Service | Concierge - Named Agent |
| Benefit - Service | ECR - Magstripe |
| Benefit - Service | Education Assistance |
| Benefit - Service | Emergency 5Advance |
| Benefit - Service | Flight Delay Pass |
| Benefit - Service | Free Shipping |
| Benefit - Service | Full ID Restoration |
| Benefit - Service | Global Airport Concierge |
| Benefit - Service | Global Assistance Services (MAC) |
| Benefit - Service | Home Assistance |
| Benefit - Service | Identity Restoration Assistance |
| Benefit - Service | Identity Theft Alerts |
| Benefit - Service | Legal Assistance |
| Benefit - Service | Local Medical Assistance (via phone) |
| Benefit - Service | LSR |
| Benefit - Service | Luxury Clubs Program |
| Benefit - Service | Luxury Dining Program |
| Benefit - Service | MasterCard Benefits Optimizer (MBO) |
| Benefit - Service | MasterCard Travel Assistance |
| Benefit - Service | MasterCard Travel Services (MTS) |
| Benefit - Service | Merchant ID Theft Alerts |
| Benefit - Service | Merchant or Issuer Breach Restoration |
| Benefit - Service | Nutritional Assistance |
| Benefit - Service | PC Assistance |
| Benefit - Service | Pet Assistance |
| Benefit - Service | Premium Emergency Services |
| Benefit - Service | Roadside Assistance |
| Benefit - Service | Travel Assistance |
| Benefit - Insurance | 24 Hour AD&D |
| Benefit - Insurance | ATM Assault (Death/Stolen Cash) |
| Benefit - Insurance | Baggage Delay |
| Benefit - Insurance | Bicycle Protection |

TABLE 1-continued

| Program | Product Name |
| --- | --- |
| Benefit - Insurance | Bill Protection |
| Benefit - Insurance | Burns |
| Benefit - Insurance | Cancer - First Diagnosis |
| Benefit - Insurance | Card Fraud |
| Benefit - Insurance | Child Care Expenses |
| Benefit - Insurance | Collision Damage Waiver |
| Benefit - Insurance | Comfort Class Return Home |
| Benefit - Insurance | Corporate Liability Waiver |
| Benefit - Insurance | Denial of Boarding |
| Benefit - Insurance | eCommerce Protection |
| Benefit - Insurance | Education/Tuition Expense |
| Benefit - Insurance | E-Guard |
| Benefit - Insurance | Emergency Family Travel cost |
| Benefit - Insurance | Enhanced Trip Cancellation/Interruption |
| Benefit - Insurance | Extended Kennel Benefit |
| Benefit - Insurance | Extended Warranty |
| Benefit - Insurance | Golfers Protection |
| Benefit - Insurance | Hijack |
| Benefit - Insurance | Home Care |
| Benefit - Insurance | Hospital Benefit Abroad |
| Benefit - Insurance | Hospital Cash |
| Benefit - Insurance | Hotel Convalescence |
| Benefit - Insurance | Hotel/Motel Burglary |
| Benefit - Insurance | ID Theft Expense Reimbursement |
| Benefit - Insurance | Inconvenienced Traveler |
| Benefit - Insurance | Key Event Ticket |
| Benefit - Insurance | Keys and Papers |
| Benefit - Insurance | Lock and Key |
| Benefit - Insurance | Lost Luggage |
| Benefit - Insurance | Lost Wallet |
| Benefit - Insurance | Medical Evacuation |
| Benefit - Insurance | Merchant Breach Protection |
| Benefit - Insurance | Missed Departure/Connection |
| Benefit - Insurance | Mobile Protection |
| Benefit - Insurance | Mugging Benefit |
| Benefit - Insurance | Natural Disaster |
| Benefit - Insurance | Personal Disaster |
| Benefit - Insurance | Personal Liability (Abroad) |
| Benefit - Insurance | Portable Electronic Good Coverage |
| Benefit - Insurance | Post Departure |
| Benefit - Insurance | Price Protection |
| Benefit - Insurance | Primary CDW (Optional Benefit) |
| Benefit - Insurance | Purchase Assurance |
| Benefit - Insurance | Purchase Assurance (small Business) |
| Benefit - Insurance | Purchase Protection |
| Benefit - Insurance | Reconstructive Surgery |
| Benefit - Insurance | Repatriation of Remains |
| Benefit - Insurance | Return of Dependent/Elderly |
| Benefit - Insurance | Ride Share |
| Benefit - Insurance | Satisfaction Guarantee |
| Benefit - Insurance | Sports Equipment |
| Benefit - Insurance | Subscription |
| Benefit - Insurance | Third Party Liability |
| Benefit - Insurance | Travel Accident |
| Benefit - Insurance | Travel Accident with Baggage Delay |
| Benefit - Insurance | Travel Accident with Baggage Delay (Optional Medical Evac) |
| Benefit - Insurance | Travel Insurance - Fully Comprehensive |
| Benefit - Insurance | Travel Medical Reimbursement |
| Benefit - Insurance | Trip Cancellation/Trip Interruption |
| Benefit - Insurance | VIP Transportation |
| Benefit - Insurance | Wallet Guard |
| Benefit - Insurance | Winter Sports |

While Table 1 includes service benefits and insurance benefits, other benefits are possible, including loyalty programs and co-brand benefits and other benefits described above or otherwise known in the art. The benefit products may be made available for the Feature Selection Engine 136 (shown in FIG. 1) to analyze as sets or bundles and/or as a possible a la carte enhancement selectable by a cardholder without being bundled with another benefit. In an a la carte enhancement, estimated value is presented to a cardholder to make a decision, and the cardholder may purchase the benefit as an addition to any bundled sets that may be recommended. More than one al a carte selection may be made, allowing individual cardholders practically unlimited ability to customize their card benefit-by-benefit as desired.

In still another contemplated fee-based, al a carte benefit enhancement using the system 100, a cardholder may change the limit or a key parameter of a selected benefit. For example, a cardholder having a 1.5% cash back benefit or redeemable point benefit for eligible purchases may pay an appropriate fee to increase the cash back benefit or redeemable point benefit to 2%. Estimated values of making such changes may likewise be provided by the system 100 to allow cardholders to make informed benefit decisions. Such features may reduce a tendency by some cardholders to switch payment cards to capitalize on what appears to be a better deal by another issuer. Such features also allow cardholders to obtain exactly the benefits that they want or need in a manner that is easily accommodated by card issuers to foster goodwill and maintain positive relationships with their cardholders. The leveraging of actual transaction data also provides educational opportunities for cardholders to understand what their payment card needs actually are and how selected benefits apply so that cardholders can more objectively and accurately decide whether benefits are relevant or irrelevant to their actual needs.

Figure 4:
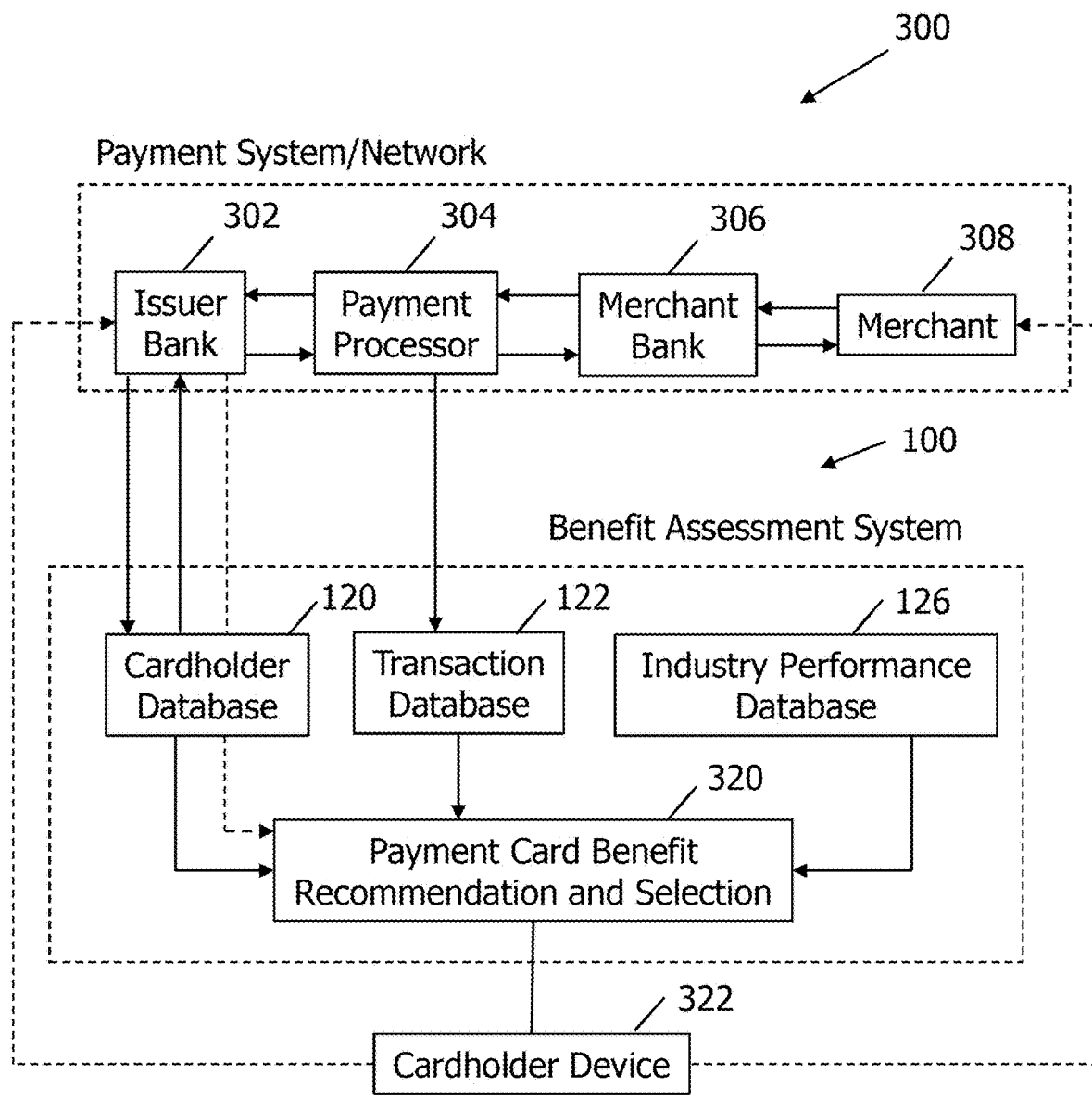
FIG. 4 is an exemplary system architecture schematic for the payment card benefit evaluation system shown in FIGS. 1 and 2 including an exemplary cardholder benefit recommendation and selection computing device.

FIG. 4 is an exemplary system architecture schematic for the payment card benefit evaluation system 100 shown in FIGS. 1 and 2 in communication with a payment card processing system ("payment network") 300, such as a credit card payment network using the network of payment processor 304 such as the Mastercard® payment network according to a proprietary communications standard promulgated by Mastercard International Incorporated for the exchange of financial transaction data between financial institutions that are registered with Mastercard International Incorporated. (Mastercard is a registered trademark of Mastercard International Incorporated located in Purchase, N.Y.).

In payment network 300, a financial institution, such as an issuing bank 302, issues a payment card, such as a credit card account or a debit card account, to a cardholder who uses the payment card to tender payment for a purchase from a merchant 308. To accept payment with the payment card, merchant 308 must normally establish an account with a financial institution that is part of the financial payment system. This financial institution is usually called the "merchant bank" or the "acquiring bank" or simply "acquirer".

When a cardholder tenders payment for a purchase with a payment card, payment card information is presented to the merchant 308. The merchant 308 passes an authorization request through a merchant bank 306 and the payment network 300 to issuer 302 for the amount of the purchase. Alternatively, merchant bank 306 may authorize a third party to perform transaction processing on its behalf. Such a third party is usually called a "merchant processor" or an "acquiring processor."

Using payment network 300, the computers of merchant bank 306 or the merchant processor will communicate with the computers of issuing bank 302 to determine whether the cardholder's account is in good standing and whether the purchase is covered by the cardholder's available credit line or account balance. Based on these determinations, the request for authorization will be declined or accepted. If the request is accepted, the transaction is given a bank network reference number, such as the Banknet Reference Number used by Mastercard International Incorporated, an authorization code, and/or other transaction identifiers that may be used to identify the transaction.

The payment network 300 may be configured to process authorization messages, such as ISO 8583 compliant messages and ISO® 20022 compliant messages. As used herein, "ISO" refers to a series of standards approved by the International Organization for Standardization (ISO is a registered trademark of the International Organization for Standardization of Geneva, Switzerland). ISO 8583 compliant messages are defined by the ISO 8583 standard which governs financial transaction card originated messages and further defines acceptable message types, data elements, and code values associated with such financial transaction card originated messages. ISO 8583 compliant messages include a plurality of specified locations for data elements. ISO 20022 compliant messages are defined by the ISO 20022 standard. For example, ISO 20022 compliant messages may include acceptor to issuer card messages (ATICA).

During the authorization process of the payment card processing system, the clearing process is also taking place. During the clearing process, merchant bank 306 provides issuing bank 304 with information relating to the sale. No money is exchanged during clearing. Clearing (also referred to as "first presentment") involves the exchange of data required to identify the cardholder's account such as the account number, expiration date, billing address, amount of the sale, and/or other transaction identifiers that may be used to identify the transaction. Along with this data, banks in the United States also include a bank network reference number, such as the Banknet Reference Number used by Mastercard International Incorporated, which identifies that specific transaction. When the issuing bank 302 receives this data, it posts the amount of sale as a draw against the available credit in the cardholder account and prepares to send payment to the merchant bank 306.

When a request for authorization is accepted, the available credit line or available account balance of cardholder's account is decreased. Normally, a charge is not posted immediately to a cardholder's account because bankcard associations, such as Mastercard International Incorporated, have promulgated rules that do not allow a merchant to charge, or "capture," a transaction until goods are shipped or services are delivered. When a merchant 308 ships or delivers the goods or services, merchant 308 captures the transaction by, for example, appropriate data entry procedures on the point-of-sale terminal. If a cardholder cancels a transaction before it is captured, a "void" is generated. If a cardholder returns goods after the transaction has been captured, a "credit" is generated.

After a transaction is captured, the transaction is settled between merchant 308, merchant bank 306, and issuing bank 302. Settlement refers to the transfer of financial data or funds between the merchant's account, merchant bank 306, and issuing bank 302 related to the transaction. Usually, transactions are captured and accumulated into a "batch," which is settled as a group.

Payment card transaction data processed on the system 100 is received and stored in the transaction database 122 for use in the profiling and benefit value estimation described herein. Benefit performance data is received from a third party device and stored in industry performance database 126. Cardholder portfolio data is received and stored in the cardholder database 120 from the issuer device associated with issuer 302. While one issuer 302 is shown, it is understood that multiple and different payment card issuers may communicate with the cardholder database 120 such that the system may accommodate multiple issuers. The cardholder database 120 may accept payment card account data for a portfolio of payment card accounts held by each issuer, or alternatively the system 100 may extract the data from an issuer device or database of the issuer on agreed upon terms. In some embodiments, payment card account data may be received and processed only for consenting cardholders who desire the payment card benefit services, and as each consenting cardholder signs onto the payment card services of the system a signal could be generated to automatically update and process the payment card account data to include new users.

Each of the databases 120, 122 and 126 are further in communication with and accessible by a payment card benefit selection computing device 320 in the system 100. The payment card benefit selection computing device 320 includes the profiling engine and the feature selection engine and performs the profiling, generation of cardholder clusters, benefit value estimation functionality, benefit recommendations, a la carte benefit options, and acceptance of desired benefits selected by cardholders. The payment card benefit selection computing device 320 also implements the web/mobile application 138 on behalf of the issuer 302, which may be accessed by a cardholder using a cardholder device 322. The cardholder device 322 may also access a merchant device associated with merchant 308 to conduct payment card transactions, or access an issuer device associated with issuer 302 via respective portals. The benefit selection computing device 320 in contemplated embodiments is fully capable of a full spectrum of cardholder services and not just the benefit assessments described herein, although issuers may choose to provide in-house cardholder services independently from the benefit selection computing device 320.

Figure 5:
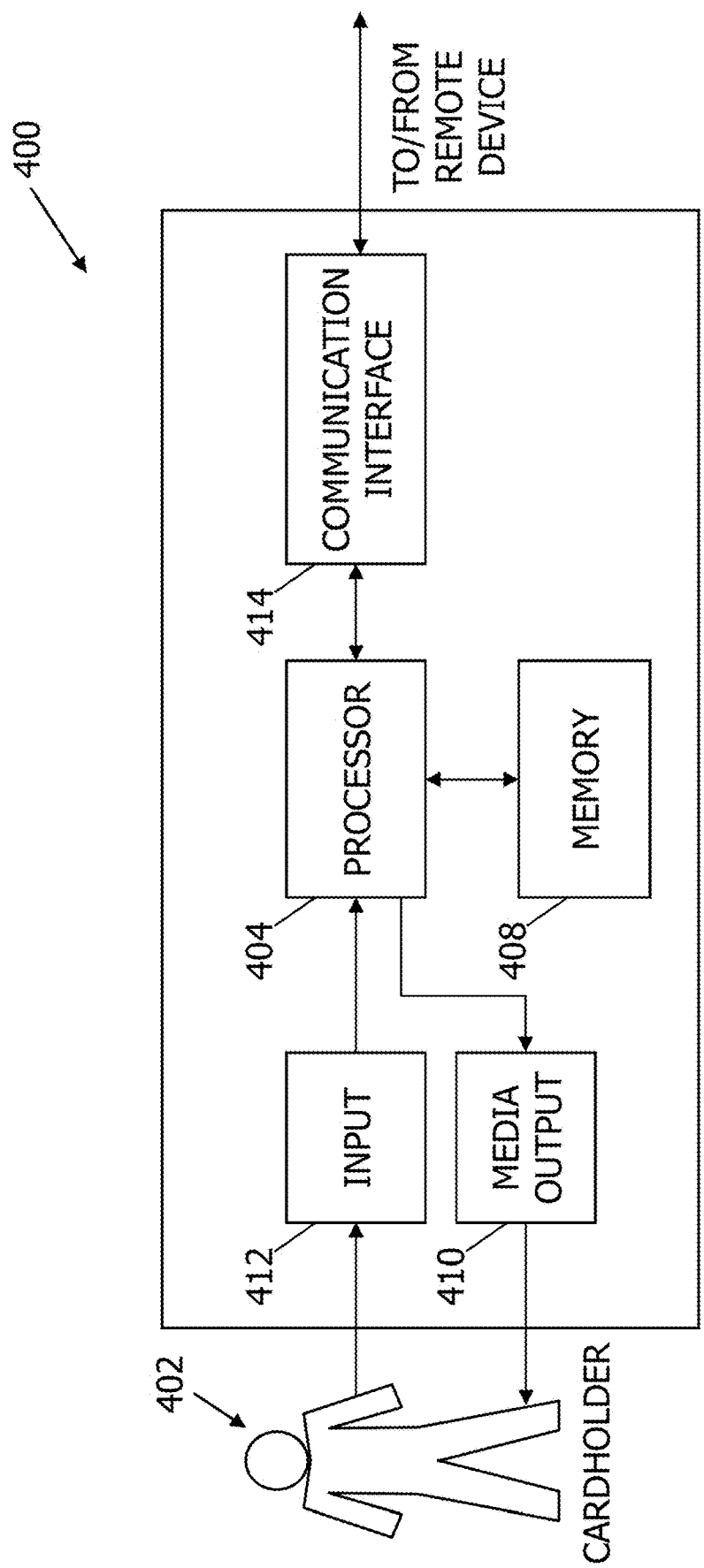
FIG. 5 illustrates an example configuration of a user device for the systems shown in FIGS. 1-2 and 4.

FIG. 5 illustrates an example configuration of a device 400 operated by a user 402, such as any of the parties described above in relation to the payment card benefit assessment system 100. User device 400 may include, but is not limited to, a smart phone, a tablet, a notebook or laptop computer, a desktop computer, and a website. In the example embodiment, device 400 includes a processor 404 for executing instructions. In some embodiments, executable instructions are stored in a memory area 408. Processor 404 may include one or more processing units, for example, a multi-core configuration. Memory area 408 is any device allowing information such as executable instructions and/or written works to be stored and retrieved. Memory area 408 may include one or more computer readable media.

The device 400 may also include at least one media output component 410 for presenting information to user 402. Media output component 410 is any component capable of conveying information to user 402. In some embodiments, media output component 410 includes an output adapter such as a video adapter and/or an audio adapter. An output adapter is operatively coupled to processor 404 and operatively couplable to an output device such as a display device, a liquid crystal display (LCD), organic light emitting diode (OLED) display, or "electronic ink" display, or an audio output device, a speaker or headphones.

In some embodiments, the device 400 includes an input device 412 for receiving input from user 402. Input device 412 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 410 and input device 412. The device 400 may also include a communication interface 414, which is communicatively couplable to a remote device in the card payment system network or with other remote devices via networks other than the payment system. Communication interface 414 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 408 are, for example, computer readable instructions for providing a user interface to user 402 via media output component 410 and, optionally, receiving and processing input from input device 412. A user interface may include, among other possibilities, a web browser and client application. Web browsers enable users, such as user 402, to display and interact with media and other information typically embedded on a web page or a website. An application allows user 402 to interact with a server application from a server system.

Multiple user devices 400 are contemplated and respectively provided for use by representatives bidding financial institutions and financial institutions offering properties for sale, representatives of the payment processor, or representatives of the merchant bank, and possibly others to effect the system 100 as shown in FIGS. 1, 2 and 4. Additional and/or alternative users and user devices may be provided, however, as desired for use with the system 100.

In a variety of contemplated examples, different combinations of user devices, being the same or different from one another, may be utilized in the system with otherwise similar effect. One or more of the user devices may be a mobile device, such as any mobile device capable of interconnecting to the Internet including a smart phone, personal digital assistant (PDA), a tablet, or other web-based connectable equipment. Alternatively, one or more of the user devices may be a desktop computer or a laptop computer. Each of the user devices may be associated with a different user as described. Each user device may be interconnected to the Internet through a variety of interfaces including a network, such as a local area network (LAN) or a wide area network (WAN), dial-in connections, cable modems and special high-speed ISDN lines.

Figure 6:
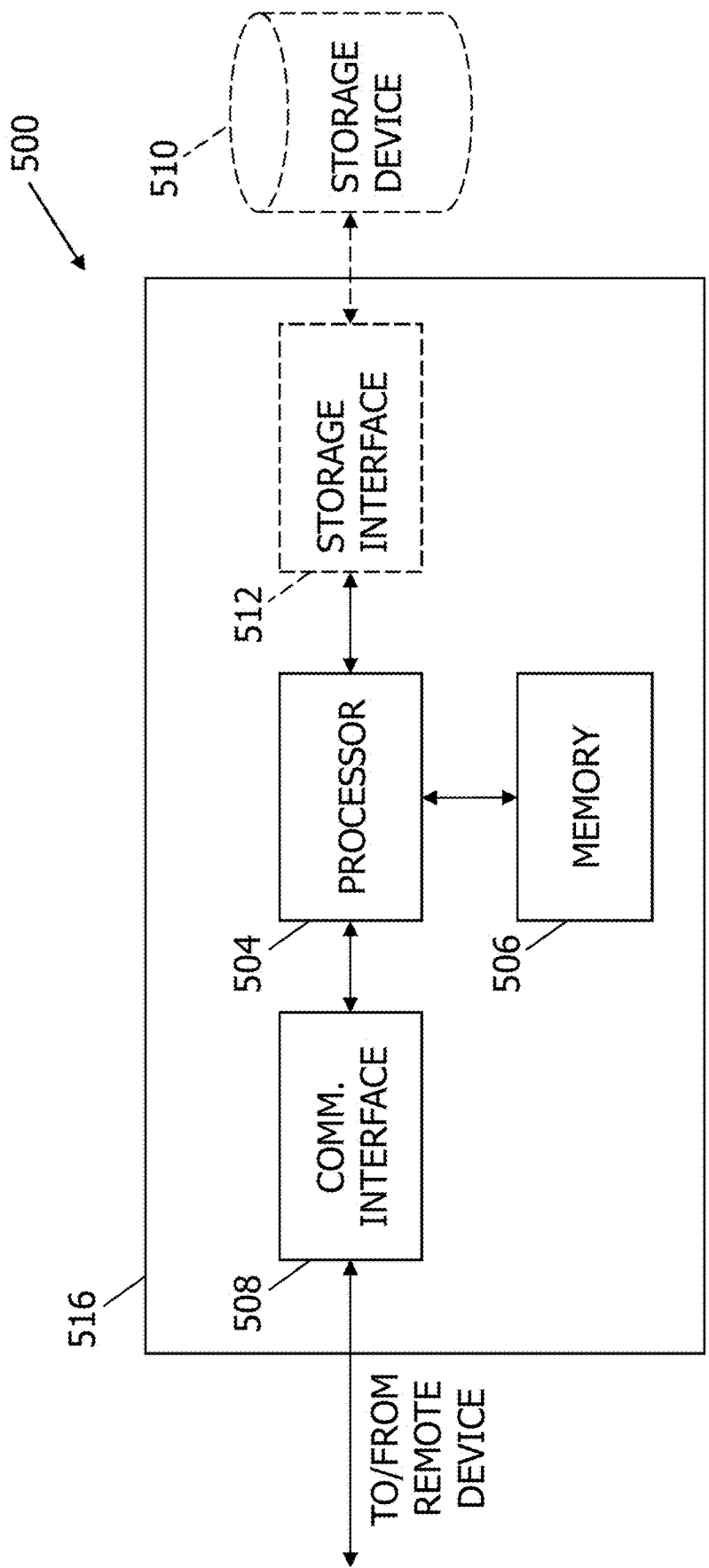
FIG. 6 is a schematic diagram of an example server computing device that may be used with the computer system shown in FIG. 4.

FIG. 6 illustrates an example configuration of server system 500 of a host benefit selection computing device 516 that may be used as the benefit selection computing device 320 shown and described above in relation to FIG. 4 that provides the payment card benefit assessment features and administrative services described above. The computing device 516 is sometimes referred to herein as a server-based network "host" device that manages the payment card benefit services. In such a server-based network, computer resources may be allocated and re-allocated to improve network operation and speed in completing certain services based on user demand, issuer preferences, merchant preferences, etc. Such allocation of resources may be determined by each issuer such that different issuers may allocated resources differently from one another in response to system inputs and usage. Database update frequency, memory allocation, and network bandwidth may therefore be the same or different amongst the various different enrolled issuers.

As shown in FIG. 6, the host benefit selection computing device 516 includes a processor 504 for executing instructions. Instructions may be stored in a memory area 506, for example. Processor 504 may include one or more processing units (e.g., in a multi-core configuration).

Processor 504 is operatively coupled to a communication interface 508 such that benefit selection computing device 516 is capable of communicating with a remote device such any of the portals and/or any of the databases or components described above in relation to FIGS. 1-2 and 4. For example, communication interface 508 may receive or transmit payment card benefit data, payment card transaction data, payment card benefit performance data, payment card benefit recommendation data, payment card benefit selection data, or other communications with the portals, components and databases described above in the system 100.

Processor 504 may also be operatively coupled to a storage device 510. Storage device 510 is any computer-operated hardware suitable for storing and/or retrieving data. In some embodiments, storage device 510 is integrated in the benefit selection computing device 516. For example benefit selection computing device 516 may include one or more hard disk drives as storage device 510. In other embodiments, storage device 510 is external to benefit selection computing device 516 and may be accessed by a plurality of server computer devices. For example, storage device 510 may include multiple storage units such as hard disks or solid state disks in a redundant array of inexpensive disks (RAID) configuration. Storage device 510 may include a storage area network (SAN) and/or a network attached storage (NAS) system.

The storage device 510 may include a database server and database which contains information and transaction data for enrolled participating financial institutions. In one embodiment, the database is centralized and stored on the server system 500. In an alternative embodiment, the database is stored remotely from the server system 500 and may be non-centralized. The database may store cardholder account portfolio data, transaction data, issuer data, profile model data, benefit performance data, benefit catalog data, and other data needed for the system 100 to operate with respect to payment card benefit services.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory area 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 7:
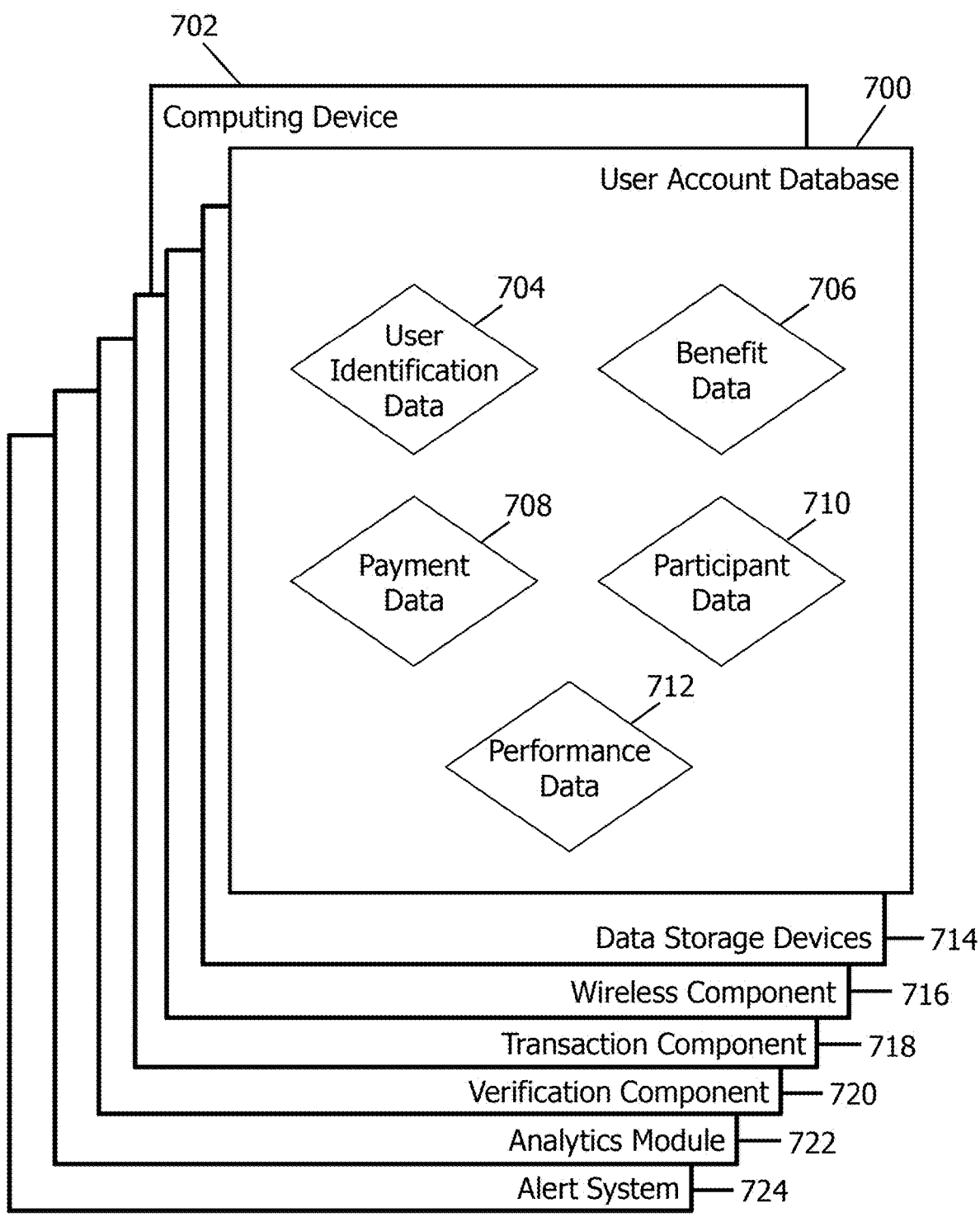
FIG. 7 shows an example configuration of a user account database within a computing device, along with other related computing components, that may be used to create, organize, and monitor a plurality of user data associated with a user.

FIG. 7 shows an example configuration of a user account database 700, within a computing device 702, along with other related computing components, that may be used to create, organize, and monitor a plurality of user data associated with a user account. In some embodiments, computing device 702 is the same or similar to server system 500. User account database 700 is coupled to several separate components within computing device 702, which perform specific tasks.

In the example embodiment, database 700 includes user identification data 704, payment card benefit data 706, payment data 708, participant data 710, and payment card benefit performance data 712. In contemplated embodiments, user identification data 704 includes, but is not limited to, a user name, a user address, and a user phone number. Payment card benefit data 706 includes data associated with payment card benefits, including selected payment card benefits by a user, available payment card benefits, estimated value data for one or more payment card benefits, cardholder profile and cardholder cluster information, or other data and information needed to provide the services described above. Payment data 708 includes, but is not limited to, card information, payment history, and a billing address. Participant data 710 includes information associated with participating merchants, including merchant identifiers, address information, contact information, etc. Performance data 712 includes data associated with cardholder behavior in relation to payment card benefits and other system use.

Computing device 702 includes the database 700, as well as data storage devices 714. Computing device 702 also includes a wireless component 716 and a transaction component 718 for correlating, for example, payment card transactions. An analytics module 722 is included for analyzing payment card benefit recommendations and cardholder acceptance rates, add-on benefit features and acceptance rates by cardholders, cardholder behavior data in interacting with the benefit assessment system and other items of interest. Further included is a verification module 720 that may communicate with a device in the payment network or another device, and an alert module 724 for transmitting an alert to any interested party concerning the operation of the auction system.

Figure 8:
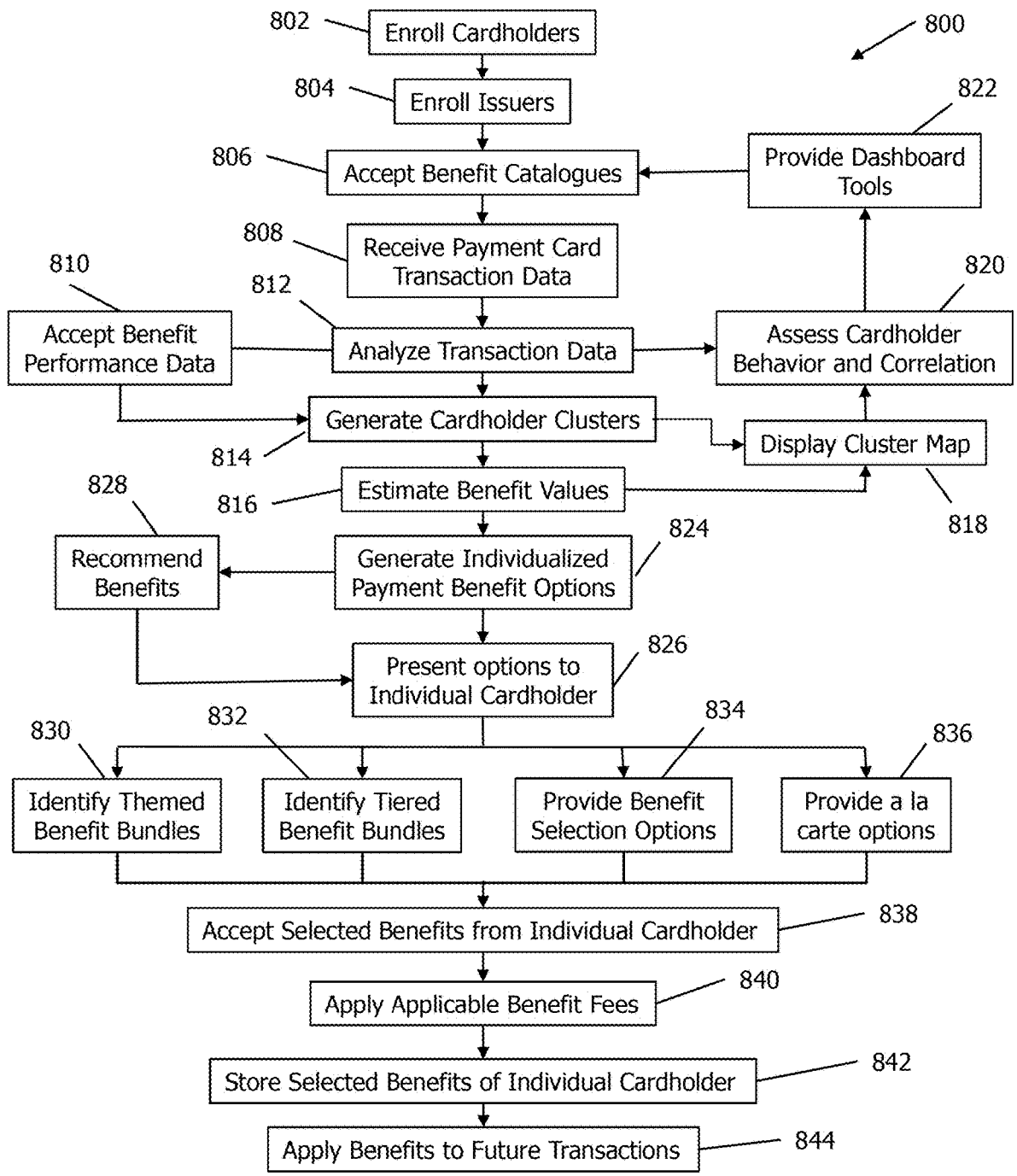
FIG. 8 shows an exemplary process of cardholder benefit assessment, recommendation and selection for the payment card benefit evaluation systems and devices shown in FIGS. 1-2 and 4-7.

FIG. 8 shows an exemplary process 800 of electronically assessing payment card benefits with the systems and devices shown in FIGS. 1-2 and 4-7. In the example shown, the process 800 is implemented by the host payment card benefit selection computing device in communication with the multi-party payment processing system and network as described above. The process 800 includes one or more unconventional steps vis-a-vis existing administration of payment card benefits.

At step 802 cardholders are enrolled for the payment card benefit assessment services described above, either as a step of cardholder account creation or as a new service for an existing cardholder. Once enrolled, benefit assessment services are activated and processing of the cardholder transaction data occurs in order for cardholders to make informed decisions about payment card benefits in view of their individual card usage.

In contemplated embodiments, enrollment includes opt-in informed consent by users to data usage by the system consistent with consumer protection laws and privacy regulations. In some embodiments, the enrollment data and/or other collected data may be anonymized and/or aggregated prior to receipt such that no personally identifiable information (PII) is received in the operation of the payment card benefit services. In other embodiments, the system may be configured to receive enrollment data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals including cardholders or merchants, or may make use of such personal information, the individuals may be provided with an opportunity to control whether such information is collected or to control whether and/or how such information is used. In addition, certain data may be processed in one or more ways before it is stored or used, so that personally identifiable information is removed.

At step 804, issuers are enrolled for the payment card benefit assessment services. Issuer enrollment for purposes of step 804 includes retrieval or acceptance of cardholder account portfolio data and information for each respective issuer, again with a view toward compliance with consumer protection laws and privacy regulations. At either of steps 802 or 804, preferences may be accepted from users regarding system notifications, contact information and addresses for any notifications made, login username and password information, etc.

At step 806, payment card benefit catalog information is accepted issuer by issuer. The payment card benefit catalog information includes data regarding the payment card benefit products made available or offered by each issuer to their cardholders. The payment card benefits may include, but are not limited to, the exemplary payment card benefits described above. Different payment card benefit catalog information is contemplated for each of the participating issuers, allowing issuers to flexibly accommodate unique needs of their particular customer bases.

At step 808, payment card transaction data is received from a payment card processing network for payment card transactions made by payment card accounts in the issuer portfolios.

At step 810, payment card benefit data (e.g., industry benefit performance data), is accepted from a third party device.

At step 812, the received payment card transaction data of step 808 and the received payment card benefit data is analyzed, and step 814 demographic groups of cardholders are defined into a plurality of payment card benefit clusters that in turn, relate to the benefit catalog data obtained at step 806 for each portfolio of cardholder accounts. At step 816, estimated benefit values for each cardholder cluster are also determined in view of the data obtained at steps 808 and 810.

At step 818, the clusters may be defined in a self-organizing map that can be displayed to respective issuers. At step 820, the map and/or the analyzed data facilitate assessment of cardholder behavior and correlation to benefits offered or accepted by cardholders across the issue portfolios. Dashboard tools are provided at step 822 allowing issuers to access or view the data in varying granularity to understand the actual impact of payment card benefits on cardholder behavior. Analytical reports and various different graphic presentation of the data in charts, tables, etc. are contemplated in the dashboard tools. Informational feedback to issuers at steps 818, 820 and 822 provides ability to issuers to update or modify their benefit catalogs in view of actual cardholder usage data and respond to cardholder demand in each particular portfolio.

At step 824, individual cardholder payment options are generated by comparing historical payment card transaction data to the cardholder clusters generated at step 814. At step 826 benefit options are presented to the individual cardholder according to the cluster(s) that the individual cardholder best aligns with so that the individual cardholder sees the most relevant payment card benefits for the individual cardholder's actual payment card use. Step 826 also provides insight to the cardholder regarding how their use of their payment cards compares to other cardholders. At step 828, particular benefits may be recommended to the individual cardholder. Machine learning techniques may be employed in the recommended benefits. Benefits may automatically be recommended and presented to the individual cardholder.

At steps 830, 832, 834 and 836 different types of individualized payment card benefit options are presented to the individual cardholder in view of the analyzed data of steps 810, 812, 814, 816 and 824. At step 830, one or more themed benefit bundles are identified to the individual cardholder, including but not limited to the exemplary themed benefit bundles described above. At step 832, one or more tiered bundles of payment card benefits are identified to the individual cardholder, including but not limited to the exemplary tiered benefit bundles described above. At step 834, a plurality of payment card benefit options are presented for self-selection by the individual cardholder without being part of a bundle, allowing the user to custom create a bundle of benefits. At step 836, or more add-on, fee-based payment card benefits option are presented to the individual cardholder. At any of steps 830, 832, 834, 836 at least one merchant rewards or merchant loyalty program option may be presented to the individual cardholder as part of a bundle, a stand-alone option or an a la carte option with or without a fee.

At step 838, benefits selected by the individual cardholder are accepted. At step 840, applicable fees are accepted, and may be processed through multi-party payment processing system and network to the individual cardholder's account. At step 842, the accepted individualized payment card benefit options from the individual cardholder are stored, and at step 844 the stored benefits are applied to eligible payment card transactions made by the individual cardholder at a future time subsequent to acceptance.

The stored benefits may be organized with a data structure such as a cardholder profile that is automatically updated as each cardholder accepts a benefit or benefits at the respective times of acceptance. Messages may be updated for record keeping purposes by the payment system and confirmation messages may be auto-generated to the cardholder, with the selected benefits uniquely being applied as profile rules to subsequent payment card transactions made by each respective cardholder where the payment card benefits are applicable. The profile rules are automatically updated as benefits are added are changed via the benefit assessment system such that the applicable benefits are immediately available to cardholders after selections are made and accepted. Such automated updates of profile rules are output by the benefit assessment system for the processing of subsequent transactions, and improves operation of the payment card system by streamlining data operations in a reduced timeframe while avoiding error in applying the changeable benefits of the cardholder as selections are made. Cardholder experience and goodwill are improved as cardholders may immediately enjoy the value of the benefits chosen with assurance that the benefits are correctly applied.

The profile rules may also include authorization message parameters so that the applicable payment card benefits may be self-identifying in the transaction data being generated on the payment system, thereby providing an evidentiary basis for the issuer to assess or defend a dispute of charges by the cardholder on the basis of an incorrect application of benefit. Chargeback procedures and dispute resolution may be automatically undertaken by the system providing further improvements to system operation and allocation of resources by the issuer.

As will be appreciated based on the foregoing specification, the above-described embodiments of the disclosure may be implemented using computer programming or engineering techniques including computer software, firmware, hardware or any combination or subset thereof, wherein the technical effects described above are achieved. Any such resulting program, having computer-readable code, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A payment card benefit assessment system comprising:
a payment card benefit selection computing device in communication with a cardholder database including a portfolio of payment card account information for at least one payment card issuer, the payment card benefit selection computing device comprising at least one processor configured to:
   accept payment card benefit catalog information from the at least one payment card issuer, the payment card benefit catalog information comprising a plurality of available benefit options;
   receive payment card transaction data from a payment card processing network, the payment card transaction data associated with payment card transactions made by payment card accounts in the portfolio, the payment card accounts associated with a plurality of individual cardholders;
   receive demographic data from a cardholder database;
   train a machine learning model to generate a plurality of clusters by aligning input data sets, including the received payment card transaction data and the demographic data for respective cardholders, that optimize an estimated benefit value of respective subsets of the plurality of available benefit options;
   map, for each individual cardholder of the plurality of individual cardholders, the payment card transaction data and the demographic data associated with the respective individual cardholder to a corresponding at least one of the plurality of clusters;
   cause to display, on a user computing device associated with the respective individual cardholder, via an electronic portal associated with the at least one payment card issuer, (i) a comparison of the payment card transaction data associated with the respective individual cardholder to the payment card transaction data associated with the corresponding at least one cluster, and (ii) a plurality of individualized payment card benefit options from among the respective subset of the plurality of available benefit options associated with the corresponding at least one cluster, the plurality of individualized payment card benefit options selectable by the respective individual cardholder using the respective user computing device;
   receive, from the user computing device associated with the respective individual cardholder, a selection of one or more of the plurality of individualized payment card benefit options; and
   automatically update a stored cardholder profile of the respective individual cardholder in response to the received selection, wherein the update causes the selected one or more individualized payment card benefit options to be applied during processing of subsequent eligible transactions of at least one payment card account of the payment card accounts associated with the respective individual cardholder and processed by the payment card processing network.

2. The system of claim 1, wherein the at least one processor is further configured to:
   accept payment card benefit data from a third party device; and
   group cardholders in the cardholder database into the plurality of clusters based on the accepted payment card benefit data and the payment card transaction data.

3. The system of claim 1, wherein the at least one processor is further configured to:
   identify at least one themed bundle of payment card benefits as a recommended set of payment card benefits to the respective individual cardholder.

4. The system of claim 1, wherein the at least one processor is further configured to:
   identify at least one tiered bundle of payment card benefits as a recommended set of payment card benefits to the respective individual cardholder.

5. The system of claim 1, wherein the at least one processor is further configured to:
   provide a plurality of payment card benefit options for self-selection by the respective individual cardholder.

6. The system of claim 1, wherein the at least one processor is further configured to:
   offer at least one add-on fee-based payment card benefit option to the respective individual cardholder.

7. The system of claim 1, wherein the at least one processor is further configured to:
   make available at least one merchant rewards or merchant loyalty program option to the respective individual cardholder.

8. The system of claim 1, wherein the at least one processor is further configured to:

receive an acceptance of at least one individualized payment card benefit option from the respective individual cardholder; and store the acceptance of the at least one individualized payment card benefit option from the respective individual cardholder for application to eligible payment card transactions made by the respective individual cardholder subsequent to the acceptance.

9. The system of claim 1, wherein the at least one processor is further configured to:

analyze cardholder behavior of the plurality of individual cardholders associated with the portfolio to assess a correlation between payment card transaction activity and payment card benefit selections made by the plurality of individual cardholders.

10. The system of claim 1, wherein the at least one processor is further configured to:

provide, via an issuer computing device associated with the at least one payment card issuer, at least one dashboard tool to the at least one payment card issuer to monitor payment card benefit activity across the portfolio.

11. The system of claim 1, wherein the at least one processor is further configured to:

generate a self-organizing cluster map including the plurality of clusters and the respective estimated benefit values for the portfolio, the self-organizing cluster map being a visual representation of the plurality of clusters and the respective estimated benefit values; and cause to display, on an issuer computing device associated with the at least one payment card issuer, the self-organizing cluster map to facilitate visualization and assessment of cardholder behavior and a correlation between payment card transaction activity and payment card benefit selections made by the plurality of individual cardholders.

12. A method for electronically assessing payment card benefits, the method implemented by at least one host computing device having at least one processor in communication with a cardholder database including a portfolio of payment card account information for at least one payment card issuer, the method comprising:

accepting payment card benefit catalog information from the at least one payment card issuer, the payment card benefit catalog information comprising a plurality of available benefit options;

receiving payment card transaction data from a payment card processing network, the payment card transaction data associated with payment card transactions made by payment card accounts in the portfolio, the payment card accounts associated with a plurality of individual cardholders;

receiving demographic data from a cardholder database;

training a machine learning model to generate a plurality of clusters by aligning input data sets, including the received payment card transaction data and the demographic data for respective cardholders, that optimize an estimated benefit value of respective subsets of the plurality of available benefit options;

mapping, for each individual cardholder of the plurality of individual cardholders, the payment card transaction data and the demographic data associated with the respective individual cardholder to a corresponding at least one of the plurality of clusters;

causing to display, on a user computing device associated with the respective individual cardholder, via an electronic portal associated with the at least one payment card issuer, (i) a comparison of the payment card transaction data associated with the respective individual cardholder to the payment card transaction data associated with the corresponding at least one cluster, and (ii) a plurality of individualized payment card benefit options from among the respective subset of the plurality of available benefit options associated with the corresponding at least one cluster, the plurality of individualized payment card benefit options selectable by the respective individual cardholder using the respective user computing device;

receiving, from the user computing device associated with the respective individual cardholder, a selection of one or more of the plurality of individualized payment card benefit options; and automatically updating a stored cardholder profile of the respective individual cardholder in response to the received selection, wherein the update causes the selected one or more individualized payment card benefit options to be applied during processing of subsequent eligible transactions of at least one payment card account of the payment card accounts associated with the respective individual cardholder and processed by the payment card processing network.

13. The method of claim 12, further comprising:
accepting payment card benefit data from a third party device; and
grouping, by the at least one host computing device, cardholders in the cardholder database into the plurality of clusters based on the accepted payment card benefit data and the payment card transaction data.

14. The method of claim 12, further comprising:
identifying, by the at least one host computing device, at least one themed bundle of payment card benefits as a recommended set of payment card benefits to the respective individual cardholder.

15. The method of claim 12, further comprising:
identifying, by the at least one host computing device, at least one tiered bundle of payment card benefits as a recommended set of payment card benefits to the respective individual cardholder.

16. The method of claim 12, further comprising:
providing, by the at least one host computing device, a plurality of payment card benefit options for self-selection by the respective individual cardholder.

17. The method of claim 12, further comprising:
offering, by the at least one host computing device, at least one add-on fee-based payment card benefit option to the respective individual cardholder.

18. The method of claim 12, further comprising:
making available, by the at least one host computing device, at least one merchant rewards or merchant loyalty program option to the respective individual cardholder.

19. The method of claim 12, further comprising:
receiving, by the at least one host computing device, an acceptance of at least one individualized payment card benefit option from the respective individual cardholder; and
storing the acceptance of the at least one individualized payment card benefit option from the respective individual cardholder for application to eligible payment card transactions made by the respective individual cardholder subsequent to the acceptance.

20. The method of claim 12, further comprising:
analyzing, by the at least one host computing device, cardholder behavior of the plurality of individual cardholders associated with the portfolio to assess a correlation between payment card transaction activity and payment card benefit selections made by the plurality of individual cardholders.

21. The method of claim 12, further comprising:
providing, to an issuer computing device associated with the at least one payment card issuer, at least one dashboard tool to the at least one payment card issuer to monitor payment card benefit activity across the portfolio.

22. The method of claim 12, further comprising:
generating, by the at least one host computing device, a self-organizing cluster map including the plurality of clusters and the respective estimated benefit values for the portfolio, the self-organizing cluster map being a visual representation of the plurality of clusters and the respective estimated benefit value for the portfolio; and
causing to display, on an issuer computing device associated with the at least one payment card issuer, the self-organizing cluster map to facilitate visualization and assessment of cardholder behavior and a correlation between payment card transaction activity and payment card benefit selections made by the plurality of individual cardholders.

23. At least one non-transitory computer-readable storage media having computer-executable instructions embodied thereon for assessing payment card benefits, wherein when executed by at least one processor in communication with a cardholder database storing a portfolio of payment card account information for at least one payment card issuer, the computer-executable instructions cause the at least one processor to:
accept payment card benefit catalog information from the at least one payment card issuer, the payment card benefit catalog information comprising a plurality of available benefit options;
receive payment card transaction data from a payment card processing network, the payment card transaction data associated with payment card transactions made by payment card accounts in the portfolio, the payment card accounts associated with a plurality of individual cardholders;
receive demographic data from a cardholder database;
train a machine learning model to generate a plurality of clusters by aligning input data sets, including the received payment card transaction data and the demographic data for respective cardholders, that optimize an estimated benefit value of respective subsets of the plurality of available benefit options;
map, for each individual cardholder of the plurality of individual cardholders, the payment card transaction data and the demographic data associated with the respective individual cardholder to a corresponding at least one of the plurality of clusters;
cause to display, on a user computing device associated with the respective individual cardholder, via an electronic portal associated with the at least one payment card issuer, (i) a comparison of the payment card transaction data associated with the respective individual cardholder to the payment card transaction data associated with the corresponding at least one cluster, and (ii) a plurality of individualized payment card benefit options from among the respective subset of the plurality of available benefit options associated with the corresponding at least one cluster, the plurality of individualized payment card benefit options selectable by the respective individual cardholder using the respective user computing device;
receive, from the user computing device associated with the respective individual cardholder, a selection of one or more of the plurality of individualized payment card benefit options; and
automatically update a stored cardholder profile of the respective individual cardholder in response to the received selection, wherein the update causes the selected one or more individualized payment card benefit options to be applied during processing of subsequent eligible transactions of at least one payment card account of the payment card accounts associated with the respective individual cardholder and processed by the payment card processing network.

\* \* \* \* \*